US012810386B2

(12) United States Patent
Wang et al.

(10) Patent No.: US 12,810,386 B2
(45) Date of Patent: Nov. 24, 2026

(54) PICTURE FILTERING METHOD AND APPARATUS, AND DEVICE

(71) Applicant: Tencent Technology (Shenzhen) Company Limited, Shenzhen (CN)

(72) Inventors: Liqiang Wang, Shenzhen (CN); Renjie Chang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 58 days.

(21) Appl. No.: 18/925,858

(22) Filed: Oct. 24, 2024

(65) Prior Publication Data

US 2025/0055991 A1 Feb. 13, 2025

Related U.S. Application Data

(63) Continuation of application No. PCT/CN2023/079134, filed on Mar. 1, 2023.

(30) Foreign Application Priority Data

May 18, 2022 (CN) ........................ 202210551039.7

(51) Int. Cl.
*G06T 5/20* (2006.01)
*G06T 5/60* (2024.01)
(Continued)

(52) U.S. Cl.
CPC .................. *G06T 5/20* (2013.01); *G06T 5/60* (2024.01); *H04N 19/117* (2014.11);
(Continued)

(58) Field of Classification Search
CPC .......... G06N 3/04; G06N 3/0464; G06N 3/08; G06N 3/09; G06T 2207/20081;
(Continued)

(56) References Cited

U.S. PATENT DOCUMENTS

| | | | | |
|---|---|---|---|---|
| 2021/0021823 | A1* | 1/2021 | Na | H04N 19/117 |
| 2021/0329286 | A1* | 10/2021 | Wang | G06N 3/09 |

FOREIGN PATENT DOCUMENTS

| | | | | |
|---|---|---|---|---|
| CN | 108184129 A | * 6/2018 | | H04N 19/82 |
| CN | 110351568 A | 10/2019 | | |
| CN | 111741300 A | 10/2020 | | |
| CN | 114025164 A | 2/2022 | | |
| CN | 114501012 A | 5/2022 | | |

OTHER PUBLICATIONS

Communication issued Jun. 5, 2025 in JP Application No. 2024-522042.

(Continued)

*Primary Examiner* — William C Vaughn, Jr.
*Assistant Examiner* — Astewaye Gettu Zewede
(74) *Attorney, Agent, or Firm* — Sughrue Mion, PLLC

(57) ABSTRACT

A picture filtering method, performed by an electronic device, includes: obtaining a picture to be filtered; determining a neural network filter; dividing the picture to be filtered according to a blocking mode corresponding to the neural network filter to obtain one or more picture blocks to be filtered, the blocking mode being a same blocking mode for a training picture used in training the neural network filter; and filtering the one or more picture blocks based on the neural network filter to obtain a filtered picture.

20 Claims, 18 Drawing Sheets

(51) Int. Cl.
*H04N 19/117* (2014.01)
*H04N 19/119* (2014.01)
*H04N 19/172* (2014.01)
*H04N 19/176* (2014.01)
*H04N 19/192* (2014.01)
*H04N 19/96* (2014.01)

(52) U.S. Cl.
CPC ......... *H04N 19/119* (2014.11); *H04N 19/172* (2014.11); *H04N 19/176* (2014.11); *H04N 19/192* (2014.11); *H04N 19/96* (2014.11)

(58) Field of Classification Search
CPC ............ G06T 2207/20084; G06T 5/20; G06T 5/60; G06T 9/002; G06T 2207/10016; G06T 2207/20021; G06T 2207/20024; G06T 7/11; H04N 19/117; H04N 19/119; H04N 19/172; H04N 19/176; H04N 19/192; H04N 19/82; H04N 19/86; H04N 19/96
USPC ........................................................ 375/240
See application file for complete search history.

(56) References Cited

OTHER PUBLICATIONS

International Search Report of PCT/CN2023/079134 dated Mar. 31, 2023 [PCT/ISA/210].
International Search Report (revised version) of PCT/CN2023/079134 dated Apr. 6, 2023 [PCT/ISA/210].
Written Opinion of PCT/CN2023/079134 dated Mar. 31, 2023 [PCT/ISA/237].
Huang Hongyue et al: "Frame-Wise 1-5, G06N3/09 CNN-Based Filtering for Intra-Frame 13-15 G06T5/20 Quality Enhancement of HEVC Videos", G06T5/60 IEEE Transactions on Circuits and Systems H04N19/119 for Video Technology, IEEE, USA, H04N19/82 vol. 31, No. 6, H04N19/176 Aug. 20, 2020 (Aug. 20, 2020), pp. 2100-2113, XP011858636, ISSN: 1051-8215, DOI: 10.1109/TCSVT.2020.3018230 [retrieved on Jun. 3, 2021].
Extended European Search Report dated Jun. 12, 2025 in Application No. 23806559.3.

* cited by examiner

PICTURE FILTERING METHOD AND APPARATUS, AND DEVICE

CROSS-REFERENCE TO RELATED APPLICATIONS

This application is a continuation application of International Application No. PCT/CN2023/079134 filed on Mar. 1, 2023, which claims priority to Chinese Patent Application No. 202210551039.7, filed with the China National Intellectual Property Administration on May 18, 2022, the disclosures of each being incorporated by reference herein in their entireties.

FIELD

The disclosure relates to the field of picture processing technologies, and in particular, to a picture filtering method and apparatus, and a device.

BACKGROUND

A digital video technology can be integrated into a variety of video apparatuses, such as digital televisions, smartphones, computers, e-readers, or video players. With the development of the video technology, video data includes a large amount of data. To facilitate transmission of the video data, the video apparatuses perform a video compression technology to allow the video data to be more effectively transmitted or stored.

In the video compression technology, a picture loss may be caused. To reduce the loss, a reconstructed picture is filtered. With the rapid development of neural network technology, in some scenarios, the reconstructed picture is filtered by using a neural network filter. However, some neural network filters have poor filtering effects.

SUMMARY

Provided are a picture filtering method and apparatus, and a device.

According to some embodiments, a picture filtering method, performed by an electronic device, includes: obtaining a picture to be filtered; determining a neural network filter; dividing the picture to be filtered according to a blocking mode corresponding to the neural network filter to obtain one or more picture blocks to be filtered, the blocking mode being a same blocking mode for a training picture used in training the neural network filter; and filtering the one or more picture blocks based on the neural network filter to obtain a filtered picture.

According to some embodiments, a picture filtering apparatus, includes: at least one memory configured to store computer program code; and at least one processor configured to read the program code and operate as instructed by the program code, the program code including: obtaining code configured to cause at least one of the at least one processor to obtain a picture to be filtered; first determining code configured to cause at least one of the at least one processor to determine a neural network filter; division code configured to cause at least one of the at least one processor to divide the picture to be filtered according to a blocking mode corresponding to the neural network filter to obtain one or more picture blocks to be filtered, the blocking mode being a same blocking mode for a training picture in training the neural network filter; and first filtering code configured to cause at least one of the at least one processor to filter the one or more picture blocks based on the neural network filter to obtain a filtered picture.

According to some embodiments, a non-transitory computer-readable storage medium, storing computer code which, when executed by at least one processor, causes the at least one processor to at least: obtain a picture to be filtered; determine a neural network filter; divide the picture to be filtered according to a blocking mode corresponding to the neural network filter to obtain one or more picture blocks to be filtered, the blocking mode being a same blocking mode for a training picture in training the neural network filter; and filter the one or more picture blocks based on the neural network filter to obtain a filtered picture.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

Figure 1:
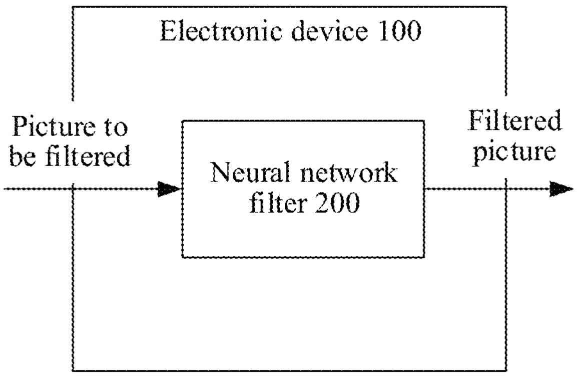
FIG. 1 is a schematic diagram of an application scenario according to some embodiments.

FIG. 1 is a schematic diagram of an application scenario according to some embodiments, including an electronic device 100. The electronic device 100 is installed with a neural network filter 200. Based on obtaining a picture to be filtered, the electronic device 100 inputs the picture to be filtered into the neural network filter 200 for filtering.

In some embodiments, the electronic device 100 includes a display apparatus. For example, the electronic device 100 may display a filtered picture through the display apparatus.

A specific type of the electronic device 100 is not limited. The electronic device 100 may be any device with a data processing function.

In some embodiments, the electronic device 100 may be a terminal device, including, for example, a smartphone, a desktop computer, a mobile computing apparatus, a notebook (for example, a laptop) computer, a tablet computer, a set top box, a television, a camera, a display device, a digital media player, a video game console, or an in-vehicle computer.

In some embodiments, the electronic device 100 may be a server. There may be one or more servers. When there are a plurality of servers, at least two servers are configured to provide different services, and/or at least two servers are configured to provide a same service, such as providing a same service in a load balanced manner. However, the disclosure is not limited thereto.

In some embodiments, the server may be an independent physical server, or may be a server cluster or a distributed system including a plurality of physical servers, or may be a cloud server that provides a cloud service, a cloud database, cloud computing, a cloud function, cloud storage, a network service, cloud communication, a middleware service, a domain name service, a security service, a content delivery network (CDN), and big data and artificial intelligence platforms, and other cloud computing services. The server may be a node of a blockchain.

In some embodiments, the server is a cloud server with powerful computing resources, highly virtualized and highly distributed.

In some embodiments, the picture to be filtered is captured by a picture acquisition device. For example, the picture acquisition device sends the captured picture to be filtered to the electronic device 100, and the electronic device 100 filters the captured picture to be filtered through the neural network filter. For another example, the electronic device 100 has a picture acquisition function. In this case, the electronic device 100 may capture a picture, and inputs the captured picture to be filtered into the neural network filter for filtering.

In some embodiments, the electronic device 100 may be an encoding device, and the picture to be filtered may be understood as a reconstructed picture. For example, the encoding device encodes and reconstructs a current picture to obtain a reconstructed picture, and inputs the reconstructed picture into the neural network filter for filtering.

In some embodiments, the electronic device 100 may be a decoding device. The decoding device decodes a bitstream and performs picture reconstruction to obtain a reconstructed picture and inputs the reconstructed picture into the neural network filter for filtering.

Some embodiments may be applied to any scenario in which a picture may be filtered.

In some embodiments, some embodiments may be applied to various scenarios, including but not limited to, a cloud technology (for example, cloud gaming), artificial intelligence, smart transportation, assisted driving, and the like.

Some embodiments may be applied to the fields of picture encoding and decoding, video encoding and decoding, hardware video encoding and decoding, dedicated circuit video encoding and decoding, real-time video encoding and decoding, and the like. Some embodiments may be combined with an Audio Video Coding Standard (AVS), for example, the H.264/Audio Video Coding (AVC) standard, the H.265/High Efficiency Video Coding (HEVC) standard, and the H.266/Versatile Video Coding (VVC) standard. Some embodiments may be combined with other proprietary or industry standards, including ITU-TH.261, ISO/IEC MPEG-1 Visual, ITU-TH.262, or ISO/IEC MPEG-2 Visual, ITU-TH.263, ISO/IEC MPEG-4 Visual, and ITU-TH.264 (also referred to as ISO/IEC MPEG-4 AVC), including scalable video codec (SVC) and multi-view video codec (MVC) extensions. The disclosure is not limited to any particular encoding and decoding standard or technology.

For convenience of understanding, a video codec system according to some embodiments is first described with reference to FIG. 2.

Figure 2:
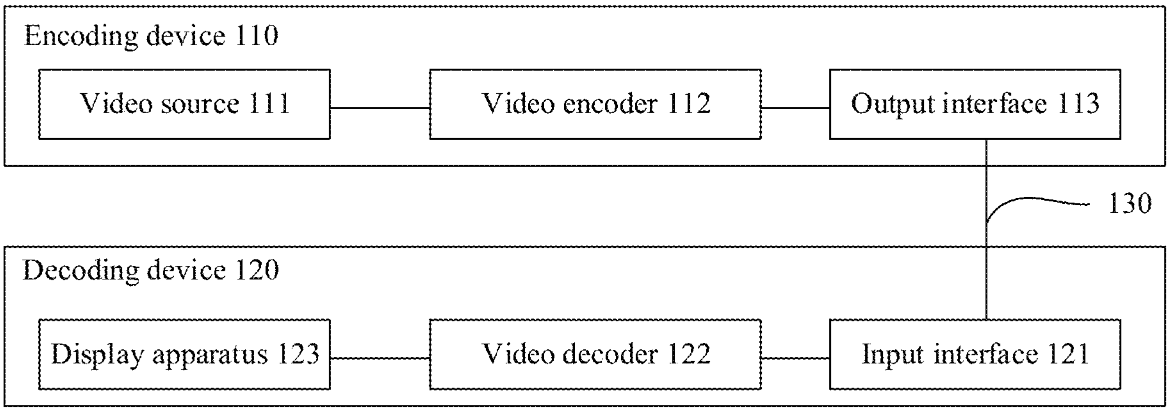
FIG. 2 is a schematic block diagram of a video codec system according to some embodiments.

FIG. 2 is a schematic block diagram of a video codec system according to some embodiments. FIG. 2 is an example. The video codec system of some embodiments include, but is not limited to, that shown in FIG. 2. As shown in FIG. 2, the video codec system includes an encoding device 110 and a decoding device 120. The encoding device is configured to encode (which may be understood as compressing) video data to generate a bitstream, and transmit the bitstream to the decoding device. The decoding device decodes the bitstream generated through encoding by the encoding device to obtain decoded video data.

In some embodiments, the encoding device 110 may be understood as a device with a video encoding function, and the decoding device 120 may be understood as a device with a video decoding function. For example, some embodiments include a wider range of apparatuses for the encoding device 110 and the decoding device 120, including, for example, smartphones, desktop computers, mobile computing apparatuses, notebook (for example, laptop) computers, tablet computers, set top boxes, televisions, cameras, display devices, digital media players, video game consoles, or in-vehicle computers.

In some embodiments, the encoding device 110 may transmit the encoded video data (for example, the bitstream) to the decoding device 120 through a channel 130. The channel 130 may include one or more media and/or apparatuses capable of transmitting the encoded video data from the encoding device 110 to the decoding device 120.

In an example, the channel 130 includes one or more communication media that enables the encoding device 110 to transmit the encoded video data directly to the decoding device 120 in real time. In this example, the encoding device 110 may modulate the encoded video data according to a communication standard, and transmit the modulated video data to the decoding device 120. The communication media includes wireless communication media, such as radio frequency spectrums. In some embodiments, the communication media may also include wired communication media, such as one or more physical transmission lines.

In another example, the channel 130 includes a storage medium. The storage medium may store the video data encoded by the encoding device 110. The storage medium includes various types of local access data storage mediums, such as optical discs, DVDs, or flash memories. In this example, the decoding device 120 may obtain the encoded video data from the storage medium.

In another example, the channel 130 may include a storage server. The storage server may store the video data encoded by the encoding device 110. In this example, the decoding device 120 may download the stored encoded video data from the storage server. In some embodiments, the storage server may store the encoded video data and may transmit the encoded video data to the decoding device 120, and may be, for example, a web server (for example, configured for a website) or a File Transfer Protocol (FTP) server.

In some embodiments, the encoding device 110 includes a video encoder 112 and an output interface 113. The output interface 113 may include a modulator/demodulator (modem) and/or a transmitter.

In some embodiments, in addition to including a video encoder 112 and an output interface 113, the encoding device 110 may also include a video source 111.

The video source 111 may include at least one of a video capture apparatus (for example, a video camera), a video archive, a video input interface, or a computer graphics system. The video input interface is configured to receive video data from a video content provider. The computer graphics system is configured to generate video data.

The video encoder 112 encodes the video data from the video source 111 to generate a bitstream. The video data may include one or more pictures or a sequence of pictures. The bitstream includes coded information of the pictures or sequence of pictures in the form of a bit stream. The coded information may include coded picture data and associated data. The associated data may include a sequence parameter set (SPS), a picture parameter set (PPS), and other syntax structures. The SPS may include parameters applied to one or more sequences. The PPS may include parameters applied to one or more pictures. The syntax structure refers to a set of zero or a plurality of syntax elements arranged in a specified order in the bitstream.

The video encoder 112 transmits the encoded video data directly to the decoding device 120 through the output interface 113. The encoded video data may be stored in a storage medium or a storage server to be read by the decoding device 120.

In some embodiments, the decoding device 120 includes an input interface 121 and a video decoder 122.

In some embodiments, in addition to including the input interface 121 and the video decoder 122, the decoding device 120 may also include a display apparatus 123.

The input interface 121 includes a receiver and/or a modem. The input interface 121 may receive the encoded video data through the channel 130.

The video decoder 122 is configured to decode the encoded video data to obtain decoded video data, and transmit the decoded video data to the display apparatus 123.

The display apparatus 123 displays the decoded video data. The display apparatus 123 may be integrated with the decoding device 120 or external to the decoding device 120. The display apparatus 123 may include various types of display apparatuses, such as a liquid crystal display (LCD), a plasma display, an organic light-emitting diode (OLED) display, or other types of display apparatuses.

In addition, FIG. 2 is an example, and some embodiments are not limited thereto. For example, some embodiments may be further applied to unilateral video encoding or unilateral video decoding.

A video coding framework involved in some embodiments is described below.

Figure 3:
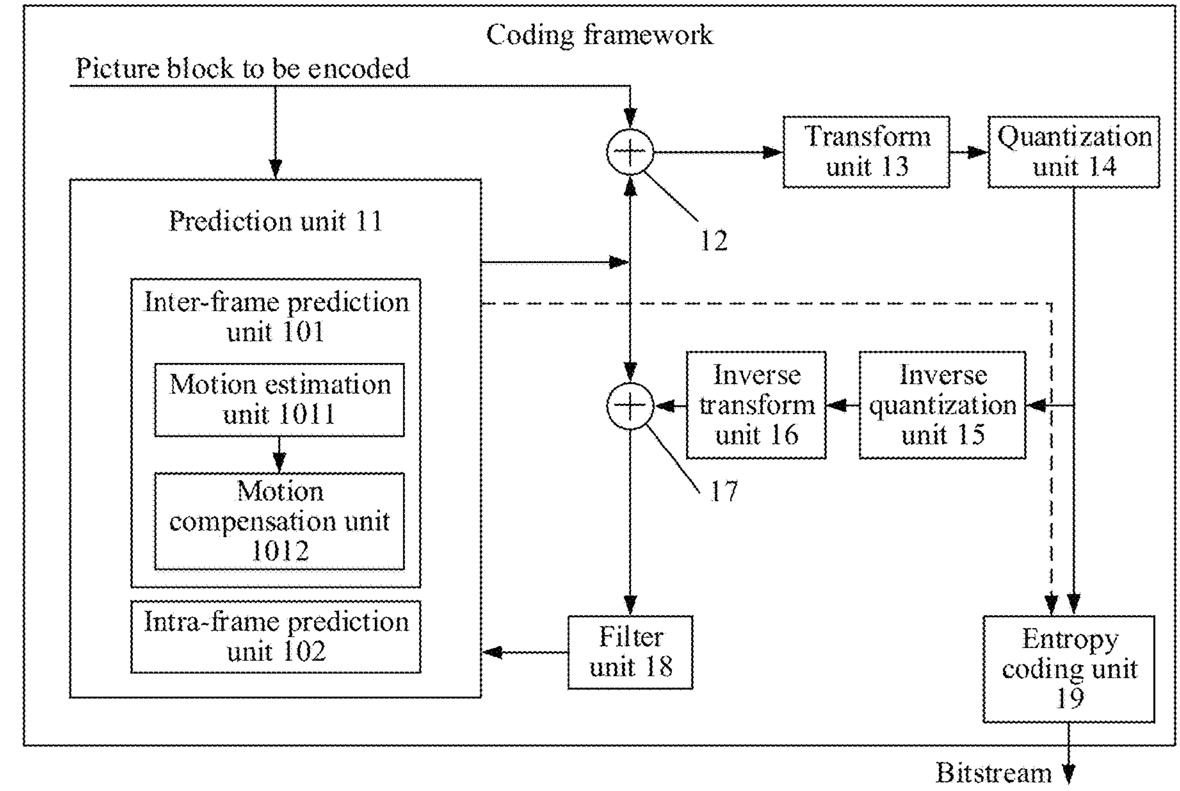
FIG. 3 is a schematic diagram of a coding framework according to some embodiments.

FIG. 3 is a schematic diagram of a coding framework according to some embodiments.

The coding framework may be configured for lossy compression or lossless compression of pictures. The lossless compression may be visually lossless compression or mathematically lossless compression.

The coding framework may be applied to picture data in a luminance-chrominance (YCbCr, YUV) format.

For example, the coding framework reads video data, and for each frame of picture in the video data, divides the frame of picture into a plurality of coding tree units (CTUs). In some examples, the CTU may be referred to as a "tree-type block", a "largest coding unit" (LCU), or a "coding tree block" (CTB). Each CTU may be associated with an equal-sized block of pixels within the picture. Each pixel may correspond to one luminance or luma sample and two chrominance or chroma samples. Therefore, each CTU may be associated with one luminance or luma sample block and two chrominance or chroma sample blocks. For example, a CTU is sized 128×128, 64×64, 32×32, or the like. A CTU may be further divided into a plurality of coding units (CUs) for encoding. The CU may be a rectangle block or a square block. The CU may be further divided into prediction units (PUs) and transform units (TUs), enabling encoding, prediction, transformation and separation, and other processing to be more flexible. In an example, the CTU is divided into CUs in a quadtree manner, and the CU is divided into TUs and PUs in the quadtree manner.

A video encoder and a video decoder can support various PU sizes. Assuming that a size of a CU is 2N×2N, the video encoder and the video decoder can support a PU size of 2N×2N or N×N for intra-frame prediction, and support symmetric PUs of 2N×2N, 2N×N, N×2N, N×N, or similar sizes for inter-frame prediction. The video encoder and the video decoder can also support 2N×nU, 2N×nD, nL×2N, and nR×2N asymmetric PUs for inter-frame prediction.

As shown in FIG. 3, the coding framework includes: a prediction unit 11, a residual generation unit 12, a transform unit 13, a quantization unit 14, an inverse quantization unit 15, an inverse transform unit 16, a reconstruction unit 17, a filter unit 18, and an entropy coding unit 19. The prediction unit 11 includes an inter-frame prediction unit 101 and an intra-frame prediction unit 102. The inter-frame prediction unit 101 includes a motion estimation unit 1011 and a motion compensation unit 1012. The coding framework may include more, fewer, or different functional components.

In some embodiments, a current block may be referred to as a current CU, a current PU, or the like. A prediction block may also be referred to as a predicted picture block or a picture prediction block. A reconstructed picture block may also be referred to as a reconstructed block or a picture reconstruction block.

Based on receiving a video, for each frame of picture constituting the video, an encoder side divides the picture into a plurality of picture blocks to be encoded. For a current picture block to be encoded, the prediction unit 11 first predicts the current picture block to be encoded by referring to the reconstructed picture block to obtain prediction information of the current picture block to be encoded. The encoder side may use an inter-frame prediction or intra-frame prediction technology to obtain the prediction information.

For example, the motion estimation unit 1011 in the inter-frame prediction unit 101 may search reference pictures in a reference picture list for a reference block of the picture block to be encoded. The motion estimation unit 1011 may generate an index indicating the reference block and a motion vector indicating a spatial displacement between the picture block to be encoded and the reference block. The motion estimation unit 1011 may output the index of the reference block and the motion vector as motion information of the picture block to be encoded. The motion compensation unit 1012 may obtain the prediction information of the picture block to be encoded based on the motion information of the picture block to be encoded.

The intra-frame prediction unit 102 may use an intra prediction mode to generate prediction information for the current picture block to be encoded. Currently, there are 15 intra prediction modes, including a planar mode, a DC mode, and 13 angle prediction modes. The intra-frame prediction unit 102 may use an intra block copy (IBC) or intra string copy (ISC) technology, or the like.

The intra prediction modes used in HEVC include a total of 35 prediction modes: the planar mode, the DC mode, and 33 angle prediction modes. The intra prediction modes used in VVC include a total of 67 prediction modes: the planar mode, the DC mode, and 65 angle prediction modes. The intra prediction modes used in AVS3 include a total of 66 prediction modes: the DC mode, the planar mode, and 63 angle prediction modes.

The residual generation unit 12 is configured to subtract the prediction information from an original signal of the current picture block to be encoded to obtain a residual signal. After the prediction, the residual signal has a much smaller amplitude value than the original signal.

The transform unit 13 and the quantization unit 14 are configured to perform transform and quantization operations on the residual signal. After the transform and quantization, transform and quantization coefficients are obtained.

The entropy coding unit 19 is configured to encode the quantization coefficients and other indication information in the encoding through an entropy coding technology to obtain a bitstream.

Further, the encoder side may reconstruct the current picture block to be encoded to provide a reference pixel for the encoding of the picture block to be encoded. For example, based on the transform and quantization coefficients of the current picture block to be encoded being obtained, the inverse quantization unit 15 and the inverse transform unit 16 perform inverse quantization and inverse transformation on the transform and quantization coefficients of the current picture block to be encoded to obtain a reconstructed residual signal. The reconstruction unit 17 adds the reconstructed residual signal to the prediction information corresponding to the current picture block to be encoded to obtain a reconstruction signal of the current picture block to be encoded, and obtains a reconstructed picture block according to the reconstruction signal.

Still further, the filter unit 18 may filter the reconstructed picture block, through deblocking filter (DBF), sample adaptive offset (SAO) filtering, adaptive loop filter (ALF), or the like. The reconstructed picture block can predict subsequent picture blocks to be encoded.

In some embodiments, the reconstructed picture block may be stored in a decoded picture buffer. The inter-frame prediction unit 101 may use a reference picture including a reconstructed block of pixels to perform inter-frame prediction on PUs of other pictures. In addition, the intra-frame prediction unit 102 may use the reconstructed picture block in the decoded picture buffer to perform intra-frame prediction on other PUs in the same picture as CUs.

Figure 4:
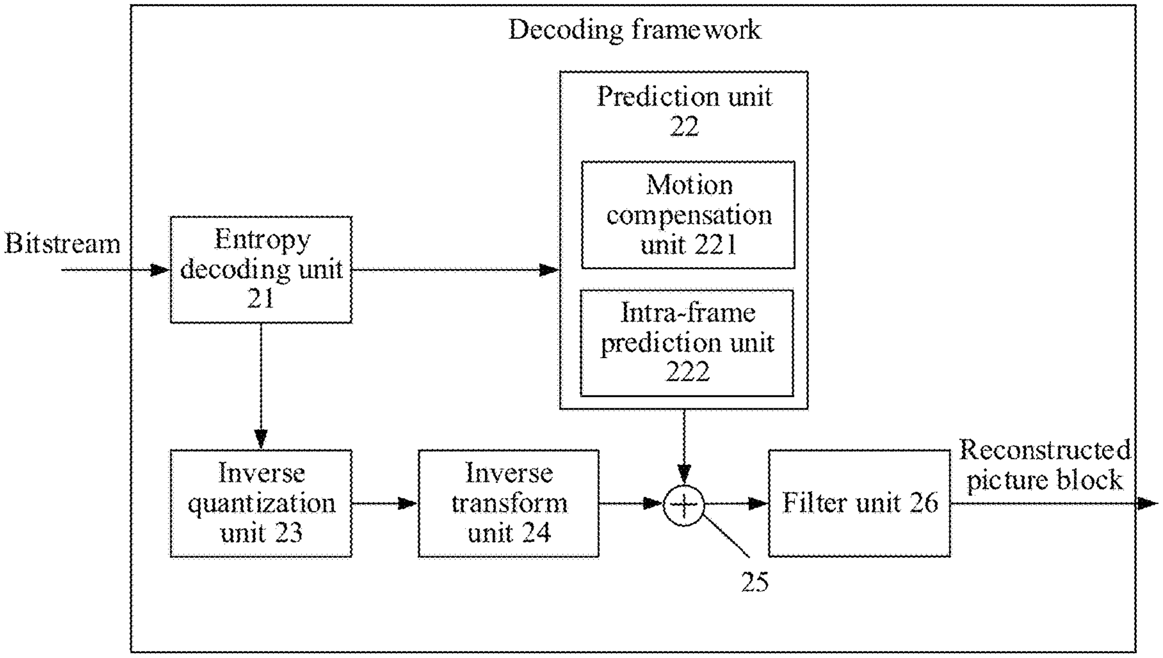
FIG. 4 is a schematic diagram of a decoding framework according to some embodiments.

FIG. 4 is a schematic diagram of a decoding framework according to some embodiments.

As shown in FIG. 4, the decoding framework includes: an entropy decoding unit 21, a prediction unit 22, an inverse quantization unit 23, an inverse transform unit 24, a reconstruction unit 25, and a filter unit 26. The prediction unit 22 includes: a motion compensation unit 221 and an intra-frame prediction unit 222.

For example, based on a decoder side obtaining a bitstream, the entropy decoding unit 21 performs entropy decoding on the bitstream to obtain transform and quantization coefficients of a current picture block to be reconstructed. The inverse quantization unit 23 and the inverse transform unit 24 perform inverse quantization and inverse transformation on the transform and quantization coefficients to obtain a reconstructed residual signal of the current picture block to be reconstructed. The prediction unit 22 predicts the current picture block to be reconstructed to obtain prediction information of the current picture block to be reconstructed. If the prediction unit 22 uses inter-frame prediction, the motion compensation unit 221 may construct a first reference picture list (list 0) and a second reference picture list (list 1) according to syntax elements parsed from the bitstream. In addition, the entropy decoding unit 21 may parses motion information of the picture block to be reconstructed. The motion compensation unit 221 may determine one or more reference blocks of the picture block to be reconstructed according to the motion information. The motion compensation unit 221 may generate the prediction information of the picture block to be reconstructed according to the one or more reference blocks. If the prediction unit 22 uses intra-frame prediction, the entropy decoding unit 21 may parse an index of the used intra prediction mode, and the intra-frame prediction unit 222 may perform intra-frame prediction according to the index by using the intra prediction mode to obtain the prediction information of the picture block to be reconstructed. The intra-frame prediction unit 222 may use an IBC or ISC technology, or the like.

Further, the reconstruction unit 25 is configured to add the prediction information to the reconstructed residual signal to obtain a reconstruction signal of the current picture block to be reconstructed and obtain a current reconstructed picture block corresponding to the current picture block to be reconstructed according to the reconstruction signal. The current reconstructed picture block may predict other subsequent picture blocks to be reconstructed. Similar to the case of the encoder side above, in some embodiments, the filter unit 26 on the decoder side may filter the current reconstructed picture block.

Block division information determined on the encoder side, as well as prediction, transformation, quantization, entropy coding, loop filtering, and other mode information or parameter information may be carried in the bitstream. The decoder side parses the bitstream and performs analysis according to known information to determine block division information the same as that on the encoder side, as well as prediction, transformation, quantization, entropy coding, loop filtering, and other mode information or parameter information, to ensure that a decoded picture obtained on the encoder side is the same as a decoded picture obtained on the decoder side.

The above is a procedure of a video code in a block-based hybrid coding framework. As technologies develop, some modules or blocks of the framework or procedure may be optimized. Some embodiments may be applied to procedures of the video codec in the block-based hybrid coding framework, but is not limited to the framework and procedure.

Figure 5:
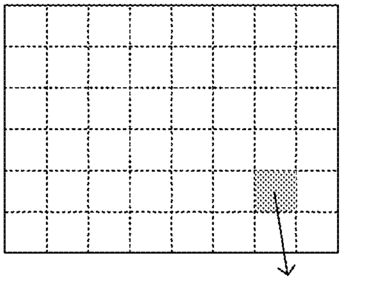
FIG. 5 to FIG. 7 are each a schematic diagram of a picture type.
Figure 6:
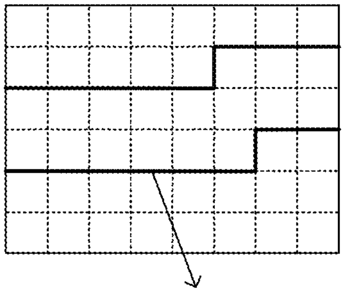
Figure 7:
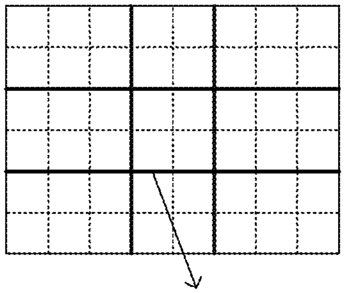

It can be learned from the prediction modes of video encoding and decoding, encoded pictures are divided into full intra-frame encoded pictures and inter-frame encoded pictures. As shown in FIG. 5 to FIG. 7, the pictures include frames, slices, and tiles. A dashed box in FIG. 5 represents boundaries of a largest CU, for example, a CTU, black solid lines in FIG. 6 represent a slice, and block solid lines in FIG. 7 represent boundaries of tiles.

Reference information for prediction of a full intra-frame encoded pictures all comes from spatial domain information of the current picture. Time domain reference information of other reference frames may be referred to in a prediction process of an inter-frame encoded picture.

As can be learned from the above related knowledge of video encoding and decoding, loop filters may include DBF, SAO, and ALF, which may be configured to filter a reconstructed picture to reduce a blocking effect, a ringing effect, or the like, thereby improving the quality of the reconstructed picture. The reconstructed picture may be restored to try to match a raw picture through a filter. However, because filtering coefficients of the filters may be manually designed, there is plenty of room for improvement. Filters based on deep learning are therefore applied to loop filter modules.

Figure 8:
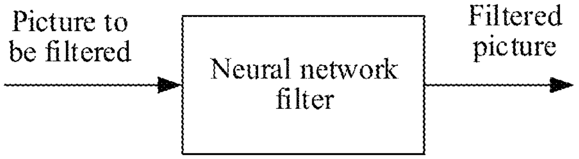
FIG. 8 is a schematic diagram of filtering according to some embodiments.

Technology involved in some embodiments is a neural network filter, such as a neural network loop filter (NNLF). As shown in FIG. 8, a picture to be filtered is input into a trained NNLF for filtering to obtain a filtered picture.

In some embodiments, in a training process of a neural network filter, an input picture may be used, and a target picture is specified as an optimization target to train a filter parameter. In the training process, the input picture and the target picture are spatially aligned. The input picture may be selected from a reconstructed distorted picture, and the target picture may be selected from a raw picture and used as the optimization target.

A loss function is to be used in a model training process. The loss function measures a difference between a predictive value and an actual value. A larger loss value indicates a greater difference. The target of the training is to reduce the loss. For coding tools based on deep learning, loss functions may include: an L1-norm loss function, an L2-norm loss function, a smooth L1 loss function.

During actual use of the neural network filter, an entire frame of picture may not be directly input for filtering. Instead, the picture is divided into sub-pictures, and the sub-pictures may be gradually input into the neural network filter for filtering.

Therefore, in the training process of the neural network filter, the input picture and the target picture are also divided to obtain matching pairs consisting of input picture blocks and target picture blocks, to train the neural network filter according to the matching pairs.

Figure 9:
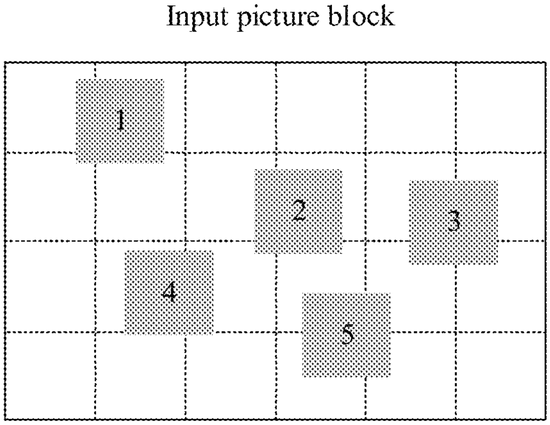
FIG. 9 to FIG. 12 each show a picture blocking mode.
Figure 10:
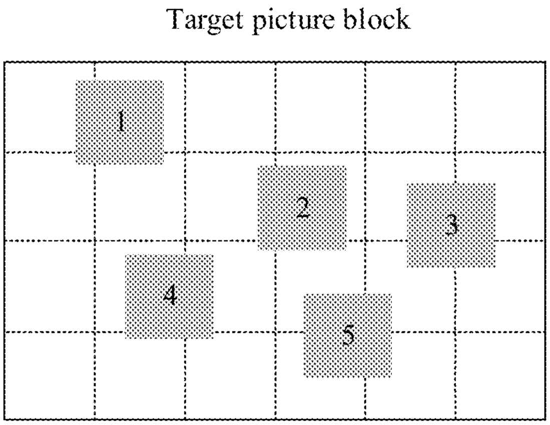
Figure 11:
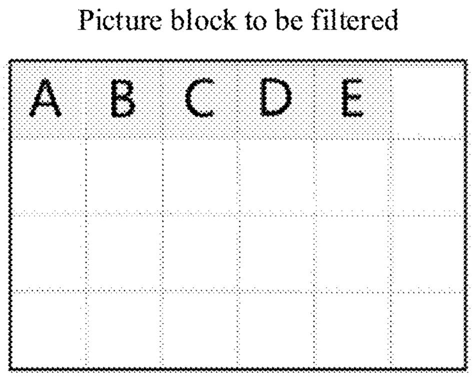
Figure 12:
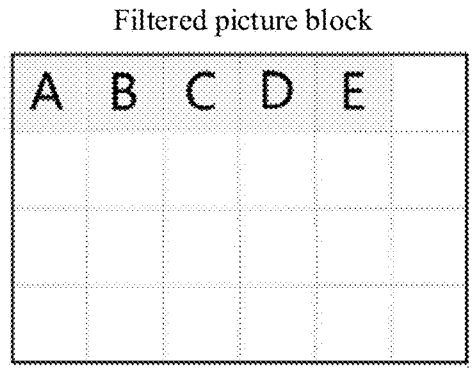

In some embodiments, during the division of the input picture and the target picture, random cropping is used in a frame of picture to select the matching pairs including the input picture blocks and the target picture blocks. As shown in FIG. 9 and FIG. 10, random cropping is performed on the input picture and the target picture to obtain picture blocks 1 to 5. In a filtering process, CTUs may be used as basic units for filtering. For example, as shown in FIG. 11 and FIG. 12, five CTUs A to E are used for actual filtering.

As can be learned from the above, due to the different division modes of picture blocks the neural network filter in the training process and in the actual usage process, a filtering effect of the neural network filter is poor.

To resolve the above technical problem, in some embodiments, in the actual filtering process, a picture to be filtered is divided according to the same blocking mode of a training picture used by the neural network filter in the training process to obtain N picture blocks to be filtered. For each of the N picture blocks to be filtered, the picture block to be filtered is filtered by using the neural network filter to obtain a final filtered picture. For example, in some embodiments, a blocking mode used by the neural network filter in the actual usage process is maintained the same as a blocking mode used during training. This may allow the neural network filter to increase filtering performance, thereby improving a picture filtering effect.

The technical solutions of some embodiments are described in below. Some embodiments may be combined with each other.

Figure 13:
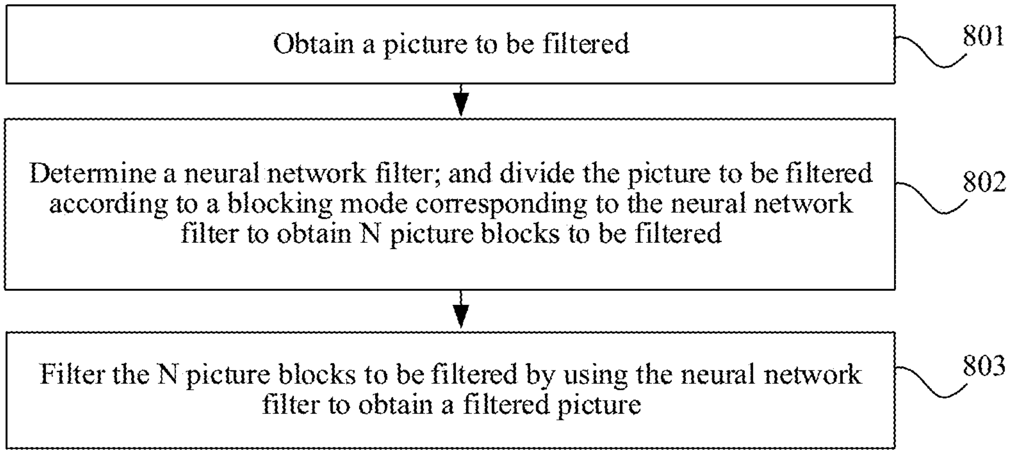
FIG. 13 is a flowchart of a picture filtering method according to some embodiments.

FIG. 13 is a flowchart of a picture filtering method according to some embodiments. As shown in FIG. 13, some embodiments include the following blocks:

801: Obtain a picture to be filtered.

In some embodiments, the method for obtaining a picture to be filtered includes, but is not limited to, the following cases:

Case 1: A non-video codec scenario. In an example, the picture to be filtered may be captured by a picture acquisition device, for example, captured by a camera. In another example, the picture to be filtered may be generated by a picture generation device, for example, drawn through a picture drawing apparatus.

Case 2: For a video codec scenario, there are at least the following modes for obtaining a picture to be filtered:

Mode 1: For an encoder side, the picture to be filtered may be a picture before encoding. For example, on the encoder side, before the picture to be filtered is encoded, the picture to be filtered is first filtered, and a filtered picture is encoded. For example, before the encoder side encodes a picture 1 to be filtered, the picture 1 to be filtered is first input into a neural network filter for filtering to obtain a filtered picture 2. Block division is performed on the picture 2 to obtain a plurality of code blocks. Each code block is predicted by using an inter-frame or intra-frame prediction method or other prediction methods to obtain a prediction block for the code block. A difference between the code block and the prediction block is calculated to obtain a residual block. The residual block is transformed and quantized to obtain quantization coefficients. Finally, the quantization coefficients are encoded.

Mode 2: For an encoder side, the picture to be filtered may be a reconstructed picture. For example, a current picture is reconstructed to obtain a reconstructed picture of the current picture. The reconstructed picture is determined as the picture to be filtered. For example, the encoder side performs block division on the current picture to obtain a plurality of code blocks. Each code block is predicted by using an inter-frame or intra-frame prediction method or other prediction methods to obtain a prediction block for the code block. A difference between the code block and the prediction block is calculated to obtain a residual block. The residual block is transformed and quantized to obtain quantization coefficients. Finally, the quantization coefficients are encoded. In addition, the encoder side further performs inverse quantization on the quantization parameters to obtain transform coefficients of the code block; performs inverse transformation on the transform coefficients to obtain a residual block; and adds the residual block to the prediction block to obtain a reconstructed block of the code block. Reconstructed blocks of all code blocks in the current picture are combined to obtain the reconstructed picture of the current picture. The reconstructed picture is used as the picture to be filtered and is input into a neural network filter for filtering to obtain a filtered picture.

Mode 3: For a decoder side, the picture to be filtered may be a reconstructed picture. For example, a current picture is reconstructed to obtain a reconstructed picture of the current picture. The reconstructed picture is determined as the picture to be filtered. For example, the decoder side decodes a received bitstream to obtain a quantization coefficient of a current block in the current picture; performs inverse quantization on the quantization coefficient to obtain a transform coefficient of the current block; and performs inverse transformation on the transform coefficient to obtain a residual block. Further, the current block is predicted by using an inter-frame or intra-frame prediction method or other prediction methods to obtain a prediction block of the current block. The residual block is added to the prediction block to obtain a reconstructed block of the current block. Reconstructed blocks of all blocks in the current picture are combined to obtain the reconstructed picture of the current picture. The reconstructed picture is used as the picture to be filtered and is input into a neural network filter for filtering to obtain a filtered picture.

In some embodiments, modes for determining a picture to be filtered include, but are not limited to, the foregoing modes. In some embodiments, other methods may be used to obtain a picture to be filtered.

802: Determine a neural network filter; and divide the picture to be filtered according to a blocking mode corresponding to the neural network filter to obtain N picture blocks to be filtered.

The blocking mode is a blocking mode for a training picture used by the neural network filter in a training process. For example, the picture to be filtered is divided according to a blocking mode the same as the blocking mode for the training picture used by the neural network filter in the training process to obtain N picture blocks to be filtered, N being a positive integer.

In some embodiments, a filter may be determined before the picture to be filtered is filtered by using the neural network filter.

In some embodiments, the neural network filter is preset or default. In this case, the preset or default neural network filter can be used directly for filtering.

In some embodiments, some embodiments include a plurality of candidate neural network filters, which are referred to as candidate filters for short below. For example, one of the plurality of candidate filters can be determined as the neural network filter of some embodiments.

In an example, at least two of the plurality of candidate filters do not have identical network structures.

In another example, at least two of the plurality of candidate filters use different blocking modes for training pictures in a training process. For example, during training of a candidate filter 1, a CTU in an input picture is determined as an input block, and a CTU at a same location in a target picture is determined as a target block. The candidate filter 1 is trained with the input block as an input and the target block as a target. For another example, during training of a candidate filter 2, two CTUs in an input picture are determined as an input block, and two CTUs at the same locations in a target picture are determined as a target block. The candidate filter 2 is trained with the input block as an input and the target block as a target.

For example, in some embodiments, the plurality of candidate filters do not have identical network structures, training parameters, training modes, and other information.

The foregoing mode for determining a neural network filter from a plurality of candidate filters includes, but is not limited to, the following modes:

Mode 1: Determine any one of the candidate filters as the neural network filter in this block.

Mode 2: Use a candidate filter with the filtering effect in the plurality of candidate filters as the neural network filter. For example, the picture to be filtered is filtered by using each of the plurality of candidate filters to obtain a filtered picture in the each candidate filter. The plurality of filtered pictures are compared to determine a filtered picture based on the effect. A candidate filter corresponding to the filtered picture with the selected effect is determined as the neural network filter in this block.

In some embodiments, a method for determining a picture effect of a filtered picture is not limited. For example, the picture effect of the filtered picture is determined by determining picture indicators such as picture clarity, sharpness, and artifacts.

Mode 3: Use a candidate filter with the smallest distortion in the plurality of candidate filters as the neural network filter. For example, the picture to be filtered is filtered by using each of the plurality of candidate filters to obtain a filtered picture in the each candidate filter. The filtered picture in the each candidate filter is compared with the picture to be filtered to determine distortion corresponding to the each candidate filter. A candidate filter with the smallest distortion is determined as the neural network filter in this block.

In some embodiments, the method for determining the distortion corresponding to the candidate filter is not limited. For example, a difference between the filtered picture in the candidate filter and the picture to be filtered is determined as the distortion corresponding to the candidate filter.

In some embodiments, the modes for determining a neural network filter include, but are not limited to, the foregoing modes.

According to the foregoing method, based on the neural network filter being determined, a blocking mode for a training picture used by the neural network filter in a training process is obtained. For example, a file of the neural network filter includes the blocking mode for the training picture used by the neural network filter in the training process. For example, the blocking mode for the training picture used by the neural network filter in the training process can be directly read from the file of the neural network filter.

In some embodiments, to improve filtering performance of the neural network filter, a blocking mode used by the neural network filter in an actual usage process is maintained the same as the blocking mode used during the training.

On this basis, in an actual filtering process, in some embodiments, the picture to be filtered is divided by using the blocking mode for the training picture used by the neural network filter in the training process to obtain N picture blocks to be filtered. For example, in some embodiments, during actual filtering, the picture to be filtered is divided by using the blocking mode for the training picture used by the neural network filter in the training process to obtain N picture blocks to be filtered. For example, in the training process, the neural network filter determines each CTU in the training picture as a training picture block for model training. For example, during the actual filtering, each CTU in the picture to be filtered is also determined as a picture block to be filtered for filtering. This ensures that the blocking mode used by the neural network filter in the actual usage process is maintained the same as the blocking mode in the training process, which may allow the neural network filter to increase performance, thereby improving a filtering effect.

A type of the blocking mode for the training picture used by the neural network filter in the training process is not limited. The blocking mode may be any blocking mode.

In some embodiments, if the blocking mode for the training picture used by the neural network filter during training includes: determining M CTUs in the training picture as a training picture block, M being a positive integer, the dividing the picture to be filtered according to a blocking mode corresponding to the neural network filter to obtain N picture blocks to be filtered in 802 includes the following 802-A:

802-A: Determine M CTUs in the picture to be filtered as one picture block to be filtered to obtain the N picture blocks to be filtered.

For example, the N picture blocks to be filtered are determined from the picture to be filtered in a mode of using M CTUs as one picture block to be filtered.

A value of M is not limited.

Figure 14:
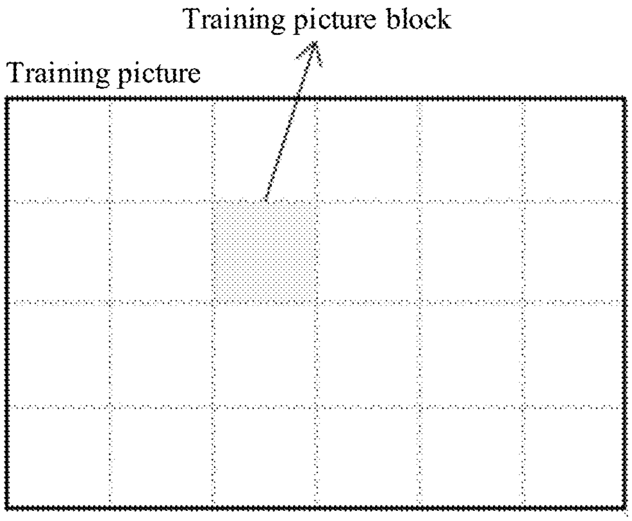
FIG. 14 to FIG. 17 are each a schematic diagram of picture blocking according to some embodiments.

Example 1: M=1. As shown in FIG. 14, in the training process of the neural network filter, one CTU of the training picture is determined as one training picture block to train the neural network filter. A region within the smallest dashed box in FIG. 14 is one CTU.

Figure 15:
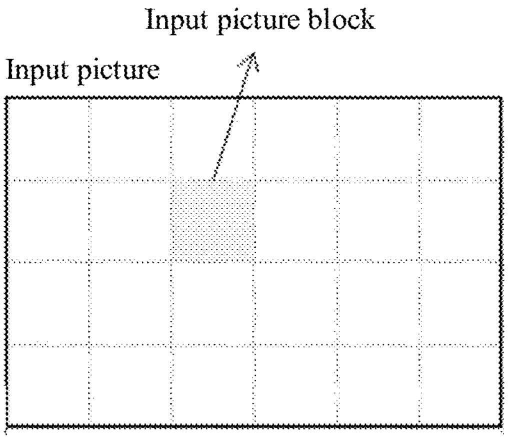
Figure 16:
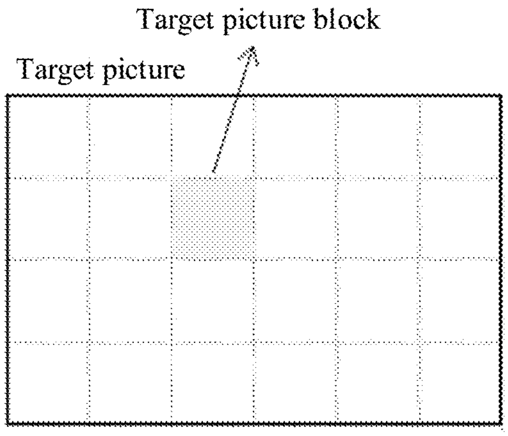

In some embodiments, if the neural network filter is obtained through training by using a supervised training method, the training picture includes an input picture and a target picture. The target picture may be understood as a supervised picture. In the training process, as shown in FIG. 15, one CTU of the input picture is determined as one input picture block, and as shown in FIG. 16, one CTU of the target picture is determined as one target picture block. The input picture block and the target picture block form a matching pair. For example, in a matching pair, a location of an input picture block in the input picture is consistent with a location of a target picture in the target picture block. The input picture block is input into the neural network filter for filtering to obtain a filtered picture block corresponding to the input picture block. The filtered picture block of the input picture block is compared with the target picture block, a loss is calculated, and parameters of the neural network filter are adjusted according to the loss. Referring to the foregoing method, an input picture block in a matching pair is further used as an input, and a target picture block in the matching pair is used as a target, to continue to train the neural network filter to obtain a trained neural network filter.

Figure 17:
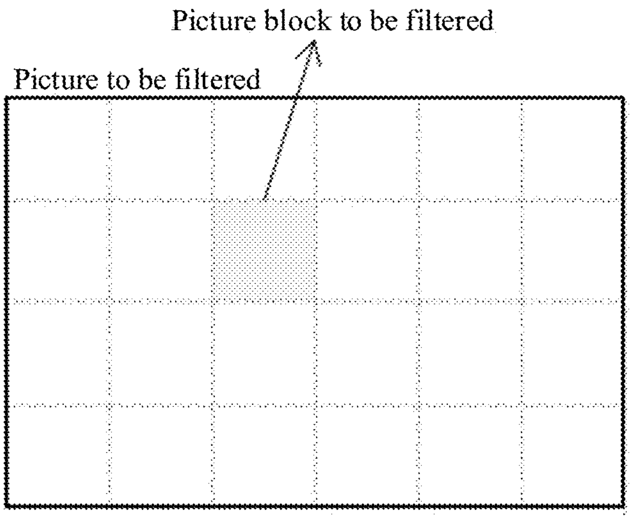

As can be learned from the above, in the example 1, the neural network filter determines one CTU in the training picture as one training picture block in the training process. Correspondingly, in an actual filtering process, as shown in FIG. 17, one CTU in the picture to be filtered is determined as one picture block to be filtered, to perform block division on the picture to be filtered to obtain the N picture blocks to be filtered.

Figure 18:
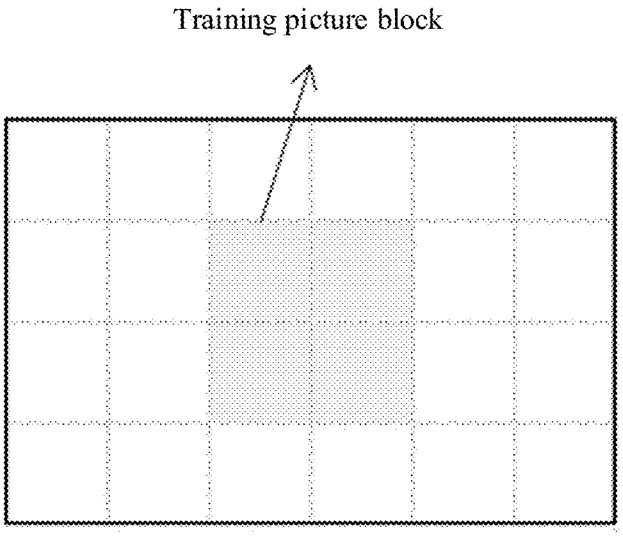
FIG. 18 to FIG. 21 are each another schematic diagram of picture blocking according to some embodiments.

Example 2: M=4. As shown in FIG. 18, in the training process of the neural network filter, four CTUs in the training picture are determined as one training picture block to train the neural network filter.

Figure 19:
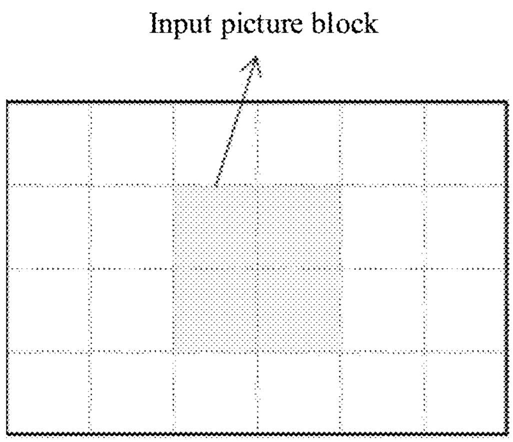
Figure 20:
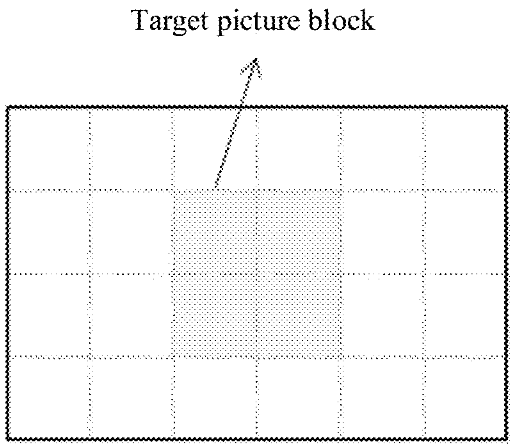

In some embodiments, if the neural network filter is obtained through training by using a supervised training method, the training picture includes an input picture and a target picture. The target picture may be understood as a supervised picture. In a training process, as shown in FIG. 19, four CTUs of the input picture are determined as one input picture block, and as shown in FIG. 20, four CTUs of the target picture are determined as one target picture block. The input picture block and the target picture block form a matching pair. For example, in a matching pair, a location of an input picture block in the input picture is consistent with a location of a target picture block in the target picture. The input picture block is input into the neural network filter for filtering to obtain a filtered picture block corresponding to the input picture block. The filtered picture block of the input picture block is compared with the target picture block, a loss is calculated, and parameters of the neural network filter are adjusted according to the loss. Referring to the foregoing method, an input picture block in a matching pair is further used as an input, and a target picture block in the matching pair is used as a target, to continue to train the neural network filter to obtain a trained neural network filter.

Figure 21:
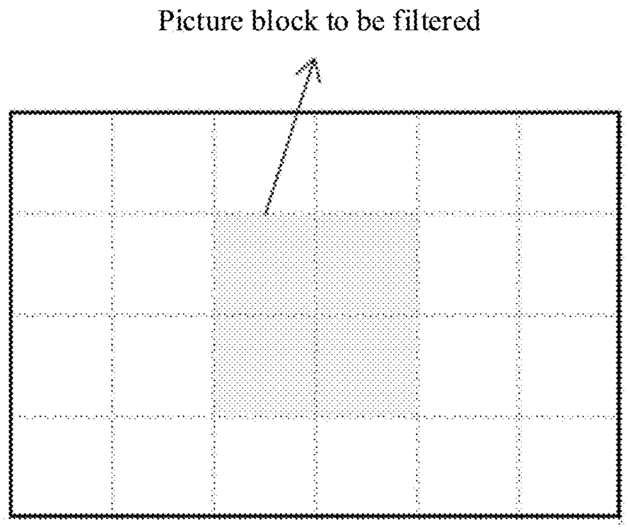

As can be learned from the above, in the example 2, the neural network filter determines four CTUs in the training picture as one training picture block in the training process. Correspondingly, in an actual filtering process, as shown in FIG. 21, four CTUs in the picture to be filtered are determined as one picture block to be filtered to obtain the N picture blocks to be filtered.

The foregoing descriptions are provided by using the examples in which M is 1 or 4. In some embodiments, M may be 2, 3, 5, or any other positive integers. However, the disclosure is not limited thereto.

In some embodiments, if the blocking mode for the training picture used by the neural network filter during training includes: determining P residual CTUs in the training picture as one training picture block, P being a positive integer, the dividing the picture to be filtered according to a blocking mode the same as the blocking mode for the training picture used by the neural network filter in the training process to obtain N picture blocks to be filtered in 802 includes 802-B as follows:

802-B: Determine P residual CTUs in the picture to be filtered as one picture block to be filtered to obtain the N picture blocks to be filtered.

For example, the N picture blocks to be filtered are determined from the picture to be filtered with the P residual CTUs as one picture block to be filtered.

A value of P is not limited.

Figure 22:
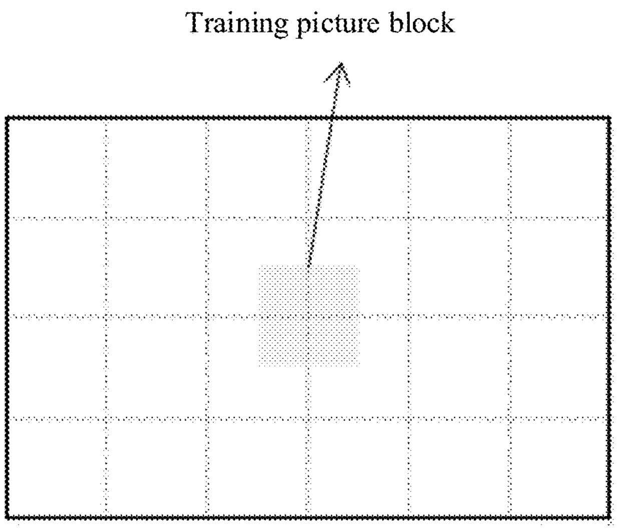
FIG. 22 to FIG. 25 are each another schematic diagram of picture blocking according to some embodiments.

For example, assuming that P=4, as shown in FIG. 22, in the training process of the neural network filter, four residual CTUs in the training picture are determined as one training picture block to train the neural network filter.

Figure 23:
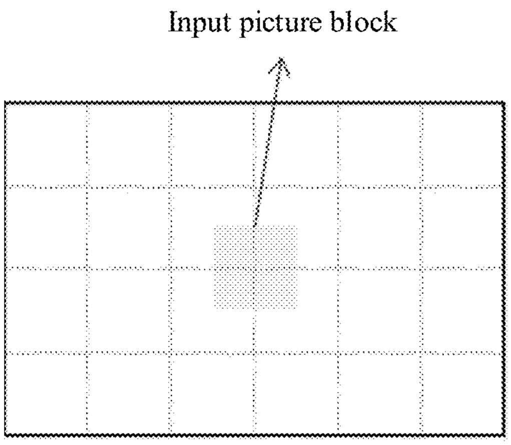
Figure 24:
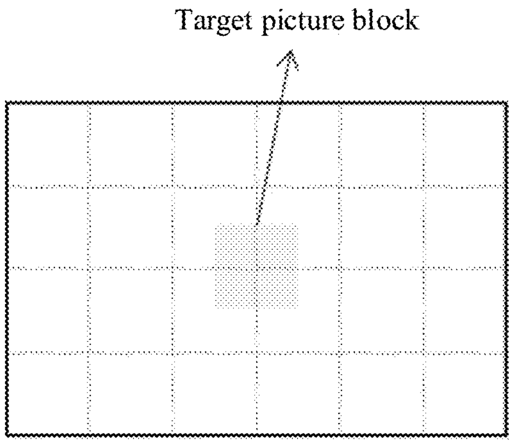

In some embodiments, if the neural network filter is obtained through training by using a supervised training method, the training picture includes an input picture and a target picture. The target picture may be understood as a supervised picture. In a training process, as shown in FIG. 23, four residual CTUs of the input picture are determined as one input picture block, and as shown in FIG. 24, four residual CTUs of the target picture are determined as one target picture block. The input picture block and the target picture block form a matching pair. The input picture block is input into the neural network filter for filtering to obtain a filtered picture block corresponding to the input picture block. The filtered picture block of the input picture block is compared with the target picture block, a loss is calculated, and parameters of the neural network filter are adjusted according to the loss. Referring to the foregoing method, an input picture block in a matching pair is further used as an input, and a target picture block in the matching pair is used as a target, to continue to train the neural network filter to obtain a trained neural network filter.

Figure 25:
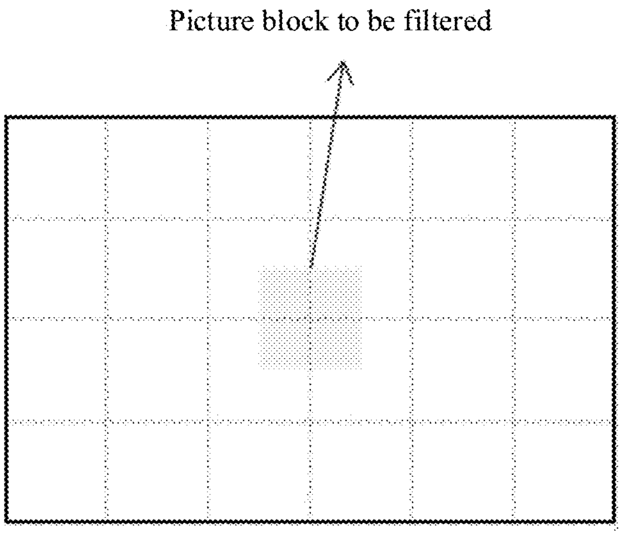

As can be learned from the above, in this example, the neural network filter determines four residual CTUs in the training picture as one training picture block in the training process. Correspondingly, in an actual filtering process, as shown in FIG. 25, four residual CTUs in the picture to be filtered are determined as one picture block to be filtered to obtain the N picture blocks to be filtered.

The foregoing description is provided by using the example in which P is 4. In some embodiments, P may be 1, 2, 3, 5, or any other positive integers. However, the disclosure is not limited thereto.

In the foregoing example, the four residual CTUs are adjacent. In some embodiments, if P is greater than 1, the P residual CTUs may not all be adjacent. For example, none of the P residual CTUs are adjacent, or some of the P residual CTUs are adjacent while some other residual CTUs are not adjacent.

Some embodiments show that the blocking mode for the training picture includes: determining M CTUs in the training picture as one training picture block, or determining P residual CTUs in the training picture as one training picture block. The blocking mode for the training picture involved in some embodiments include, but is not limited to, the foregoing examples. However, the disclosure is not limited thereto.

According to the foregoing block, based on the picture to be filtered being divided by using the blocking mode for the training picture used by the neural network filter in the training process to obtain N picture blocks to be filtered, 803 below is performed.

803: Filter the N picture blocks to be filtered by using the neural network filter to obtain a filtered picture.

In some embodiments, the picture to be filtered is divided by using the blocking mode the same as the blocking mode for the training picture to obtain the N picture blocks to be filtered. For each of the N picture blocks to be filtered, the picture block to be filtered is input into the neural network filter for filtering to obtain a filtered picture block of the picture block to be filtered. According to the foregoing method, a filtered picture block of the each picture block to be filtered in the N picture blocks to be filtered may be determined, and the filtered picture blocks of the N picture blocks to be filtered form the filtered picture.

In the filtering process, performing filtering in combination with adjacent content outside boundaries of a picture block can improve a filtering effect of a boundary region of the picture block. Therefore, on this basis, to further improve the filtering effect of the neural network filter, in some embodiments, the neural network filter is obtained through training by using an extended picture block of the training picture block. For example, in some embodiments, in the training process of the filter, the training picture is divided according to the blocking mode for the training picture to obtain the training picture block. In addition, the training picture block may be further extended outwards to obtain the extended picture block, and the extended picture block is used to train the neural network filter. In this case, 803 includes the following blocks 803-A1 to 803-A3:

803-A1: For each of the N picture blocks to be filtered, extend the picture block to be filtered according to an extension mode for the training picture block to obtain an extended picture block to be filtered.

803-A2: Filter the extended picture block to be filtered by using the neural network filter to obtain a filtered extended picture block.

803-A3: Determine a picture region corresponding to the picture block to be filtered in the filtered extended picture block as a filtered picture block of the picture block to be filtered.

To further improve the filtering effect of the picture to be filtered, some embodiments use the same extension mode as the training picture block to extend the picture block to be filtered. In a filtering process, the picture to be filtered may be divided by using the same blocking mode as the blocking mode for the training picture to obtain the N picture blocks to be filtered. For each of the N picture blocks to be filtered, the picture block to be filtered is extended outwards by using the same extension mode as the training picture block to obtain the extended picture block to be filtered. The extended picture block to be filtered is input into the neural network filter for filtering to obtain the filtered extended picture block of the extended picture block to be filtered. The filtered extended picture block and the picture block to be filtered may be different in size. Therefore, cropping the filtered extended picture block may include: determining the picture region corresponding to the picture block to be filtered in the filtered extended picture block as the filtered picture block of the picture block to be filtered. According to the foregoing block, a filtered picture block of the each picture block to be filtered in the N picture blocks to be filtered may be determined, and the filtered picture blocks of the N picture blocks to be filtered are stitched to obtain a final filtered picture.

An extension mode for the training picture block is not limited.

In some embodiments, the extension mode for the training picture block includes extending at least one boundary region of the training picture block outwards. In this case, the extending the picture block to be filtered according to an extension mode for the training picture block to obtain an extended picture block to be filtered in 803-A1 includes:

extending at least one boundary region of the picture block to be filtered outwards to obtain the extended picture block to be filtered.

Figure 26:
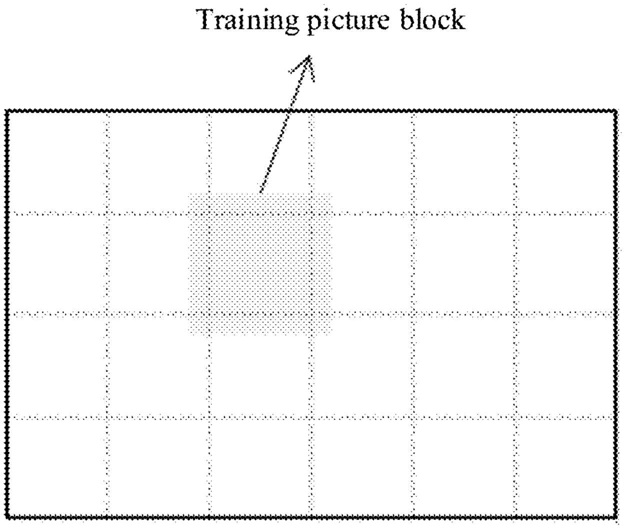
FIG. 26 to FIG. 29 are each a schematic diagram of picture block extension according to some embodiments.

In some examples, as shown in FIG. 26, in the training process of the neural network filter, the training picture block is extended outwards in all directions, and the extended training picture block is used to train the neural network filter.

Figure 27:
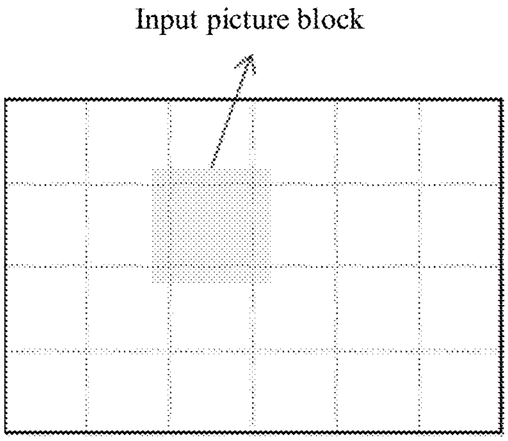
Figure 28:
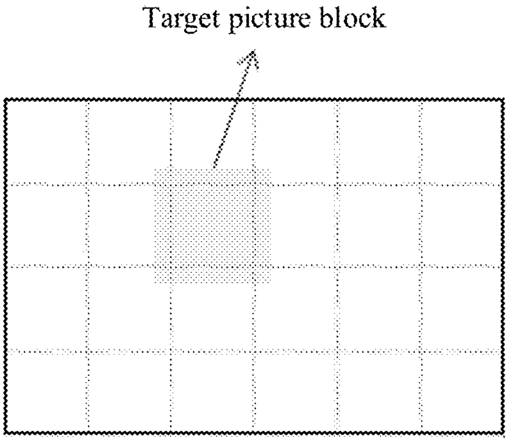

In some embodiments, if the neural network filter is obtained through training by using a supervised training method, the training picture includes an input picture and a target picture. The target picture may be understood as a supervised picture. In a training process, as shown in FIG. 27, one CTU of the input picture is determined as one input picture block, and the input picture block is extended outwards in all directions to obtain an extended input picture block. As shown in FIG. 28, one CTU of the target picture is determined as one target picture block, and the target picture block is extended outwards in all directions to obtain an extended target picture block. The extended input picture block is input into the neural network filter for filtering to obtain a filtered picture block corresponding to the extended input picture block. The filtered picture block of the extended input picture block is compared with the extended target picture block, a loss is calculated, and parameters of the neural network filter are adjusted according to the loss. Referring to the foregoing method, an extended input picture block in a next matching pair is further used as an input, and an extended target picture block in the next matching pair is used as a target, to continue to train the neural network filter to obtain a trained neural network filter.

Figure 29:
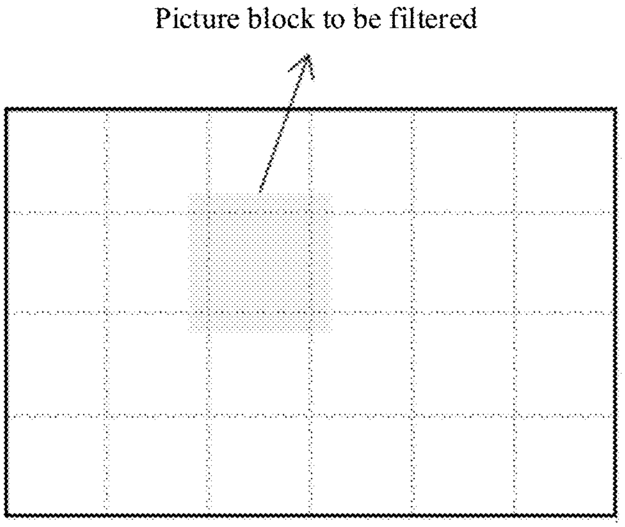

As can be learned from the above, in this example, in the training process, the neural network filter determines one CTU in the training picture as one training picture block, and extends the training picture block outwards in all directions to obtain an extended training picture block. Correspondingly, in an actual filtering process, as shown in FIG. 29, one CTU in the picture to be filtered is determined as one picture block to be filtered. The picture block to be filtered is extended outwards in all directions by using the extension mode for the training picture block to obtain an extended picture block to be filtered. The extended picture block to be filtered is input into the neural network filter for filtering to obtain a filtered extended picture block. A picture region corresponding to the picture block to be filtered in the filtered extended picture block is determined as a filtered picture block of the picture block to be filtered.

Figure 30:
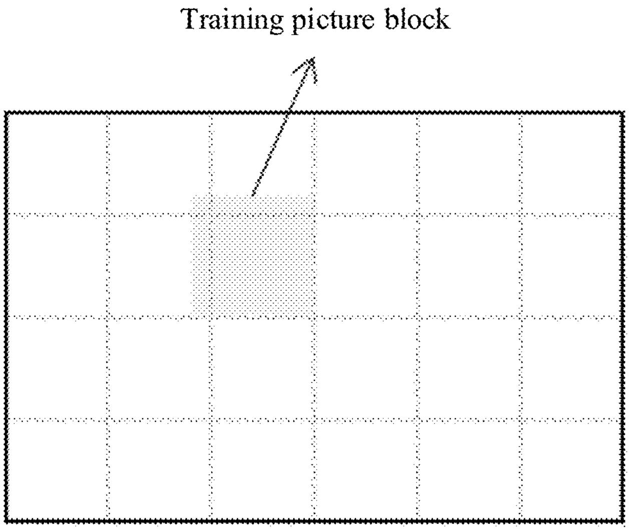
FIG. 30 to FIG. 33 are each another schematic diagram of picture block extension according to some embodiments.

In some examples, as shown in FIG. 30, in the training process of the neural network filter, a left boundary and an upper boundary of the training picture block are extended outwards, and an extended training picture block is used to train the neural network filter.

Figure 31:
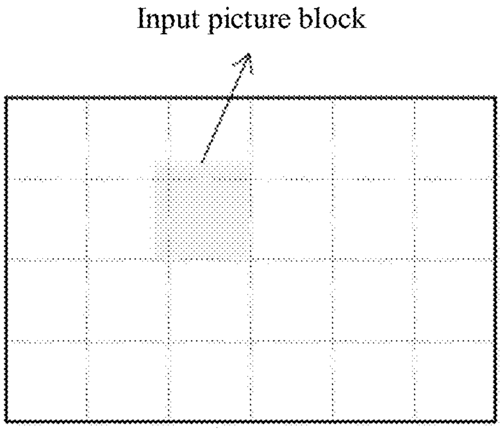
Figure 32:
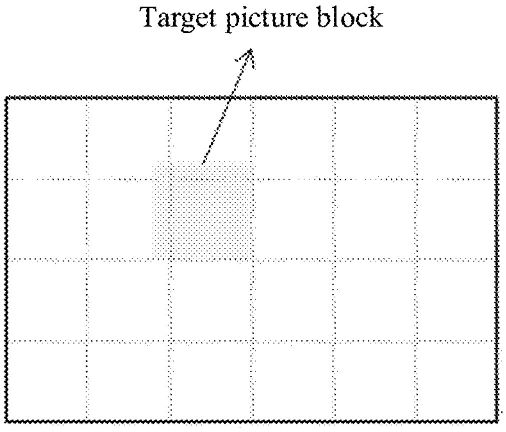

In some embodiments, if the neural network filter is obtained through training by using a supervised training method, the training picture includes an input picture and a target picture. The target picture may be understood as a supervised picture. In a training process, as shown in FIG. 31, one CTU of the input picture is determined as one input picture block, and a left boundary and an upper boundary of the input picture block are extended outwards to obtain an extended input picture block. As shown in FIG. 32, one CTU of the target picture is determined as one target picture block, and a left boundary and an upper boundary of the target picture block are extended outwards to obtain an extended target picture block. The extended input picture block is input into the neural network filter for filtering to obtain a filtered picture block corresponding to the extended input picture block. The filtered picture block of the extended input picture block is compared with the extended target picture block, a loss is calculated, and parameters of the neural network filter are adjusted according to the loss. Referring to the foregoing method, an extended input picture block in a matching pair is further used as an input, and an extended target picture block in the matching pair is used as a target, to continue to train the neural network filter to obtain a trained neural network filter.

Figure 33:
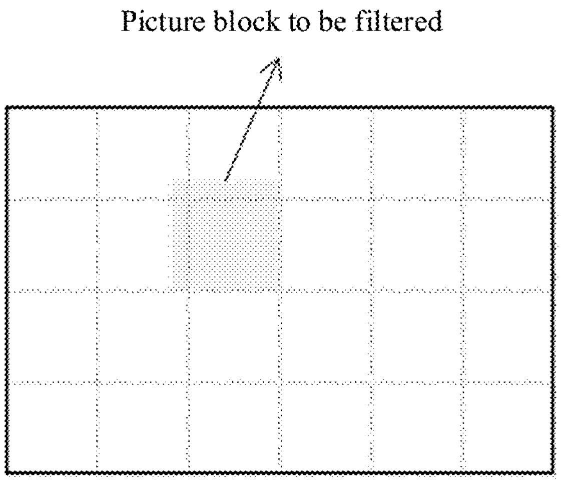

As can be learned from the above, in this example, in the training process, the neural network filter determines one CTU in the training picture as one training picture block, and a left boundary and an upper boundary of the training picture block are extended outwards to obtain an extended training picture block. Correspondingly, in an actual filtering process, as shown in FIG. 33, one CTU in the picture to be filtered is determined as one picture block to be filtered. A left boundary and an upper boundary of the picture block to be filtered are extended outwards by using the extension mode for the training picture block to obtain an extended picture block to be filtered. The extended picture block to be filtered is input into the neural network filter for filtering to obtain a filtered extended picture block. A picture region corresponding to the picture block to be filtered in the filtered extended picture block is determined as a filtered picture block of the picture block to be filtered.

In some examples, the extension mode for the training picture block further includes extending other boundaries of the training picture block outwards. However, the disclosure is not limited thereto.

In some embodiments, to further improve the filtering effect of the neural network filter, in the training process, in addition to the input picture block, a reference picture block of the input picture block is also input. To maintain the consistency between the actual filtering process and the training process, 803 includes the following blocks 803-B1 and 803-B2:

803-B1: For each of the N picture blocks to be filtered, determine a reference picture block of the picture block to be filtered.

803-B2: Input the picture block to be filtered and the reference picture block of the picture block to be filtered into the neural network filter for filtering to obtain a filtered picture block of the picture block to be filtered.

In some embodiments, if input information of the neural network filter in the training process includes an input picture block and a reference picture block of the input picture block, in the actual filtering process, in addition to including the picture block to be filtered, the input information also includes the reference picture block of the picture block to be filtered.

The determining mode for the reference picture block of the picture block to be filtered is not limited.

In some embodiments, the determining mode for the reference picture block of the picture block to be filtered is different from a determining mode for a reference picture block of the training picture block.

In some embodiments, the determining mode for the reference picture block of the picture block to be filtered is the same as the determining mode for the reference picture block of the input picture block. In this case, the determining a reference picture block of the picture block to be filtered in 803-B1 includes the following blocks 803-B11 and 803-B12:

803-B11: Obtain a determining mode for the reference picture block of the input picture block, the determining mode being configured for determining the corresponding reference picture block according to at least one of spatial domain information and time domain information of the input picture block.

803-B12: Determine the reference picture block of the picture block to be filtered according to the determining mode for the reference picture block of the input picture block.

In some embodiments, the determining mode for the reference picture block of the input picture block may be read from a file of the neural network filter. In some embodiments, if a training device for the neural network filter is the same as an actual filtering device, the device stores the determining mode for the reference picture block of the input picture block.

Based on the determining mode for the reference picture block of the input picture block being obtained, the reference picture block of the picture block to be filtered is determined by using the determining mode for the reference picture block of the input picture block. For example, in some embodiments, the determining mode for the reference picture block of the picture block to be filtered is consistent with the determining mode for the reference picture block of the input picture block.

A type of the reference picture block is not limited.

In some embodiments, if the reference picture block of the input picture block includes at least one of a temporal reference picture block and a spatial reference picture block of the input picture block, the reference picture block of the picture block to be filtered includes at least one of a temporal reference picture block and a spatial reference picture block of the picture block to be filtered.

The spatial reference picture block may select a picture region at a fixed relative location of a current input picture block. For example, the spatial reference picture block of the input picture block and the input picture block are located in the same frame, for example, both located in the input picture.

A difference between the temporal reference picture block and the spatial reference picture block is that the temporal reference picture block and the current input picture block are in different frames. A reference location of the temporal reference picture block may select a reference block at the same spatial location as the current input picture.

In some embodiments, a type of the reference picture block of the picture block to be filtered is the same as a type of the reference picture block of the input picture block.

Example 1: If the reference picture block of the input picture block includes a spatial reference picture block, the reference picture block of the picture block to be filtered also includes a spatial reference picture block. In this case, 803-B12 includes the following block:

803-B12-A: Determine the spatial reference picture block of the picture block to be filtered according to a determining mode for the spatial reference picture block of the input picture block.

In this example, if the reference picture block of the input picture block includes a spatial reference picture block, the spatial reference picture block of the picture block to be filtered is determined according to a determining mode for the spatial reference picture block of the input picture block, to implement accurate determining of the spatial reference picture block of the picture block to be filtered.

In some embodiments, the spatial reference picture block of the picture block to be filtered can be determined by using the determining mode for the spatial reference picture block of the input picture block. This ensures that input information of the neural network filter in the training process maintains the same as input information in the actual filtering process, thereby improving the filtering performance of the neural network filter.

A type of the spatial reference picture block is not limited.

In some embodiments, if the spatial reference picture block of the input picture block includes at least one of an upper left picture block, a left-side picture block, and an upper picture block of the input picture block in the input picture, the spatial reference picture block of the picture block to be filtered includes at least one of an upper left picture block, a left-side picture block, and an upper picture block of the picture block to be filtered in the picture to be filtered. In this case, 803-B12-A includes determining at least one of the upper left picture block, the left-side picture block, and the upper picture block of the picture block to be filtered in the picture to be filtered as the spatial reference picture block of the picture block to be filtered.

Figure 34:
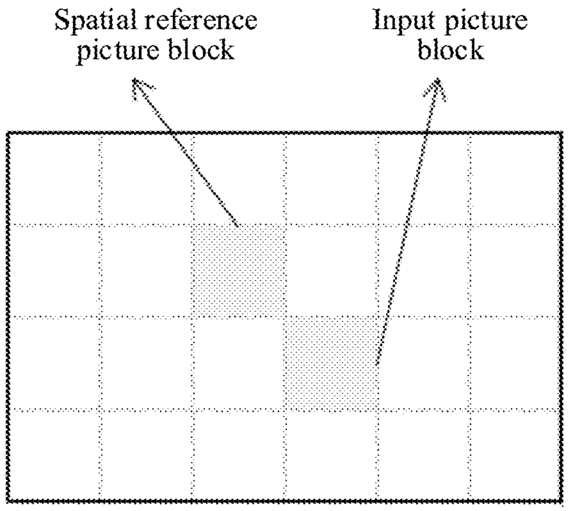
FIG. 34 and FIG. 35 are each a schematic diagram of a spatial reference picture block according to some embodiments.
Figure 35:
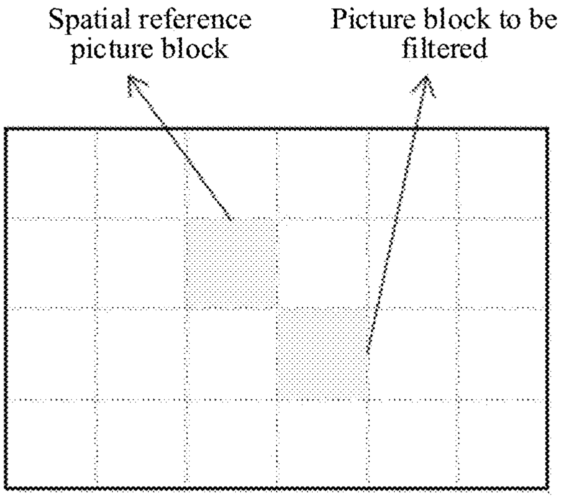

For example, as shown in FIG. 34, if the spatial reference picture block of the input picture block includes an upper left picture block of the input picture block in the input picture, as shown in FIG. 35, an upper left picture block of the picture block to be filtered in the picture to be filtered is determined a spatial reference picture block of the picture to be filtered.

Figure 36:
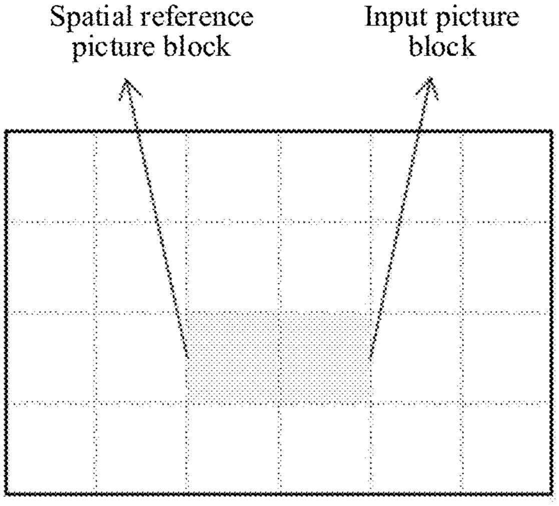
FIG. 36 and FIG. 37 are each another schematic diagram of a spatial reference picture block according to some embodiments.
Figure 37:
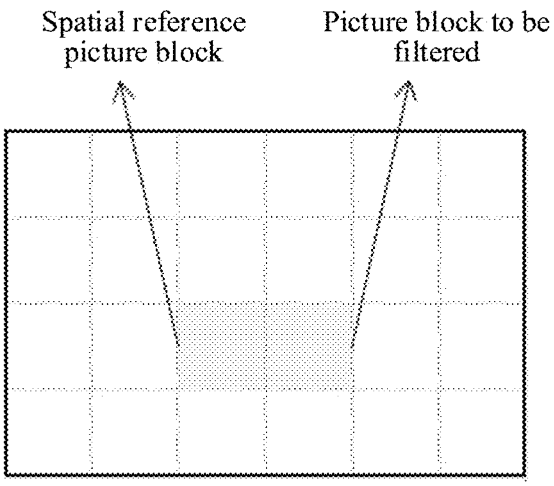

For another example, as shown in FIG. 36, if the spatial reference picture block of the input picture block includes a left-side picture block of the input picture block in the input picture, as shown in FIG. 37, a left-side picture block of the picture block to be filtered in the picture to be filtered is determined as a spatial reference picture block of the picture to be filtered.

Figure 38:
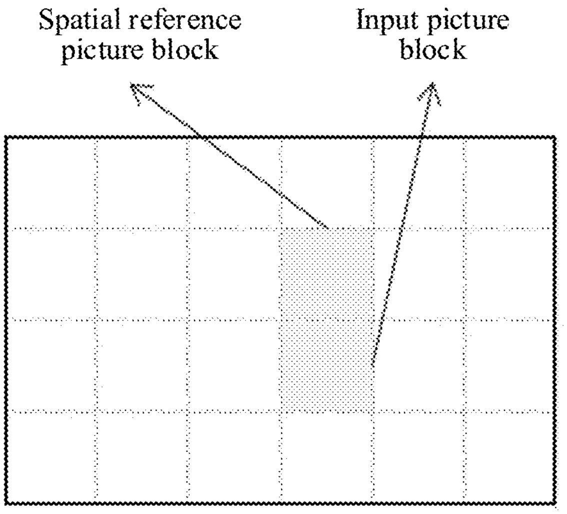
FIG. 38 and FIG. 39 are each another schematic diagram of a spatial reference picture block according to some embodiments.
Figure 39:
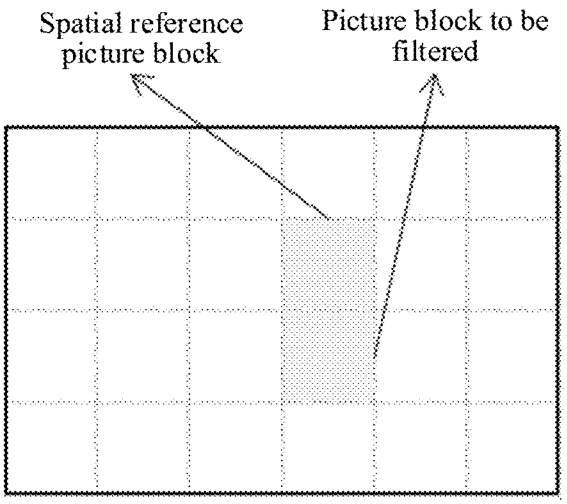

For another example, as shown in FIG. 38, if the spatial reference picture block of the input picture block includes an upper picture block of the input picture block in the input picture, as shown in FIG. 39, an upper picture block of the picture block to be filtered in the picture to be filtered is determined as a spatial reference picture block of the picture to be filtered.

Figure 40:
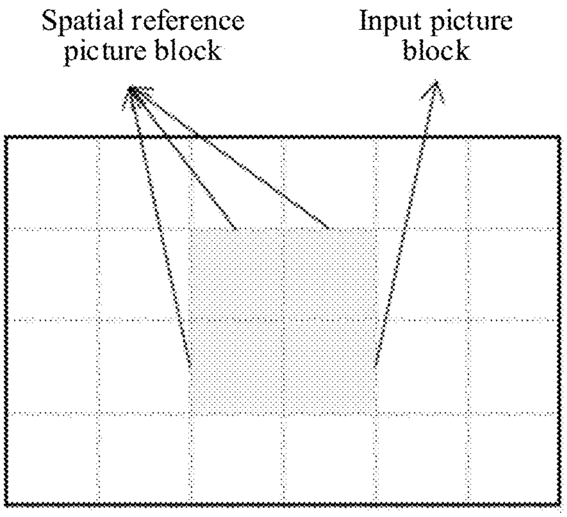
FIG. 40 and FIG. 41 are each another schematic diagram of a spatial reference picture block according to some embodiments.
Figure 41:
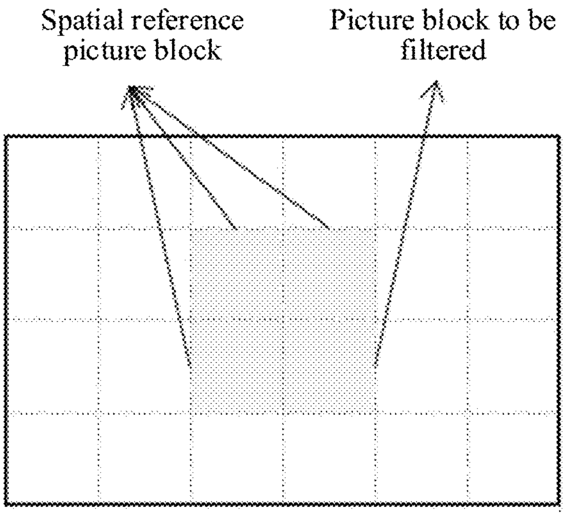

For another example, as shown in FIG. 40, if the spatial reference picture block of the input picture block includes an upper left picture block, a left-side picture block, and an upper picture block of the input picture block in the input picture, as shown in FIG. 41, an upper left picture block, a left-side picture block, and an upper picture block of the picture block to be filtered in the picture to be filtered are determined as the spatial reference picture block of the picture to be filtered.

In some embodiments, to further improve the filtering effect, in the training process, in addition to the input picture block, the spatial reference picture block of the input picture block is also input to improve the filtering effect of the neural network filter. For example, in the actual filtering process, to maintain the consistency between input information in the actual filtering process and input information in the training process, the spatial reference picture block of the picture block to be filtered is determined by using the same determining mode as the determining mode for the spatial reference picture block of the input picture block, and the picture block to be filtered and the spatial reference picture block of the picture block to be filtered are input into the neural network filter to achieve the filtering effect for the picture to be filtered.

Example 2: If the reference picture block of the input picture block includes a temporal reference picture block, the reference picture block of the picture block to be filtered also includes a temporal reference picture block. In this case, 803-B12 includes the following block:

803-B12-B: Determine the temporal reference picture block of the picture block to be filtered according to the determining mode for the temporal reference picture block of the input picture block.

In this example, if the reference picture block of the input picture block includes the temporal reference picture block, the temporal reference picture block of the picture block to be filtered is determined according to the determining mode for the temporal reference picture block of the input picture block, to implement accurate determining of the temporal reference picture block of the picture block to be filtered.

In some embodiments, the temporal reference picture block of the picture block to be filtered can be determined by using the determining mode for the temporal reference picture block of the input picture block. This ensures that input information of the neural network filter in the training process maintains the same as input information in the actual filtering process, thereby improving the filtering performance of the neural network filter.

In some embodiments, 803-B12-B includes: determining a reference picture of the picture to be filtered; and determining a picture block at a location corresponding to the picture block to be filtered in the reference picture of the picture to be filtered as the temporal reference picture block of the picture block to be filtered.

Figure 42:
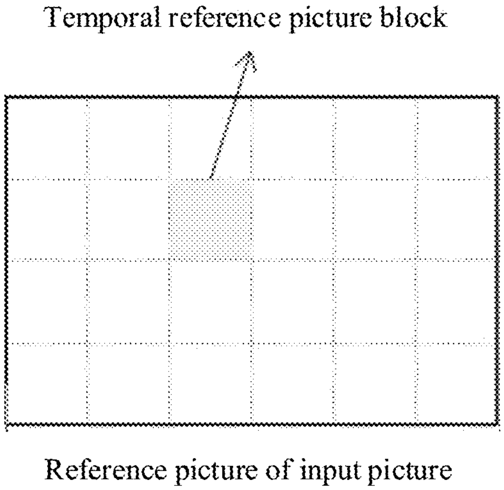
FIG. 42 and FIG. 43 are each a schematic diagram of a temporal reference picture block according to some embodiments.
Figure 43:
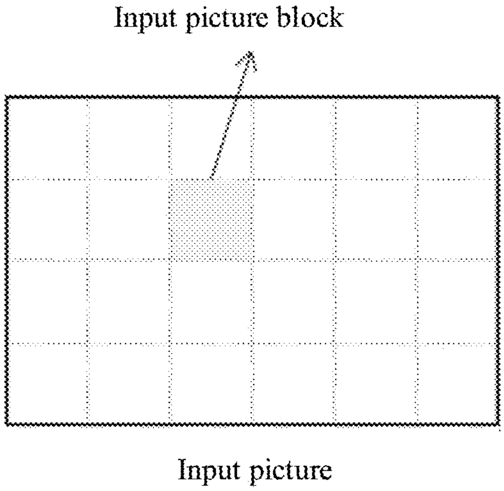
Figure 44:
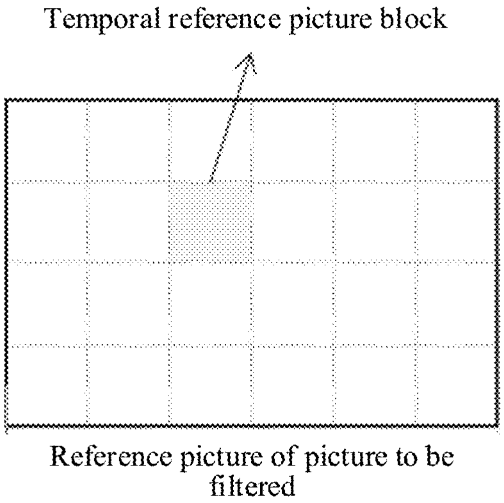
FIG. 44 and FIG. 45 are each another schematic diagram of a temporal reference picture block according to some embodiments.
Figure 45:
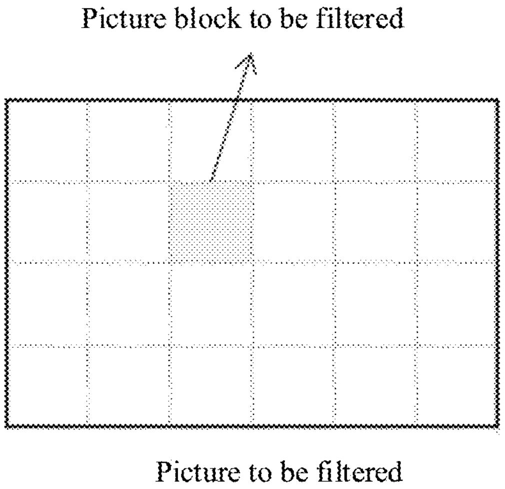

For example, as shown in FIG. 42 and FIG. 43, the temporal reference picture block of the input picture block is a picture block at a location corresponding to the input picture block in a reference picture of the input picture. For example, a location of the temporal reference picture block of the input picture block in the reference picture of the input picture is consistent with a location of the input picture block in the input picture. In this case, as shown in FIG. 44 and FIG. 45, the process of determining the temporal reference picture block of the picture block to be filtered is: first, determining a reference picture of the filtered picture, and determining a picture block at a location corresponding to the picture block to be filtered in the reference picture of the filtered picture as the temporal reference picture block of the picture block to be filtered.

A type of the reference picture is not limited. For example, when the method of some embodiments is applied to an encoder side, the reference picture of the picture to be filtered may be any encoded picture. If the method of some embodiments is applied to a decoder side, the reference picture of the picture to be filtered may be any decoded picture.

In some embodiments, to further improve the filtering effect, in the training process, in addition to the input picture block, the temporal reference picture block of the input picture block is also input to improve the filtering effect of the neural network filter. For example, in the actual filtering process, to maintain the consistency between input information in the actual filtering process and input information in the training process, the temporal reference picture block of the picture block to be filtered is determined by using the same determining mode as the determining mode for the temporal reference picture block of the input picture block, and the picture block to be filtered and the temporal reference picture block of the picture block to be filtered are input into the neural network filter to achieve the filtering effect for the picture to be filtered.

In some embodiments, if the reference picture block of the input picture block includes a spatial reference picture block and a temporal reference picture block, the reference picture block of the picture block to be filtered also includes a spatial reference picture block and a temporal reference picture block. For the process of determining the spatial reference picture block and the temporal reference picture block of the picture block to be filtered, refer to the foregoing process of determining a spatial reference picture block and a temporal reference picture block.

According to the foregoing method, the N picture blocks to be filtered are filtered by using the neural network filter to obtain a filtered picture.

In some embodiments, the filtering method of some embodiments may be applied to a loop filter module. In this case, the method of some embodiments further includes: generating, based on the filtered picture, a reference picture for prediction, and storing the generated reference picture into a buffer for decoding, to be used as a reference picture of a subsequently decoded picture. The mode for generating a reference picture based on the filtered picture may be: directly using the filtered picture as the reference picture, or reprocessing the filtered picture, such as performing filtering or other modes of processing on the filtered picture and using the reprocessed picture as the reference picture. In some embodiments, the filtered picture may be displayed by a display device.

In some embodiments, the method of some embodiments may be applied to video post-processing, for example, generating a display picture based on the filtered picture, inputting the generated display picture into a display device for display, and skipping storing the filtered picture or a reprocessed picture of the filtered picture into a decoding buffer. For example, in some embodiments, the display picture generated based on the filtered picture is input into the display device for display, but is not stored in the decoding buffer as a reference picture. For example, based on a reconstructed picture of a current picture being determined by decoding a video, the reconstructed picture is stored in the decoding buffer as a reference picture, or the reconstructed picture is filtered by using a loop filter method, such as using at least one filter of DBF, SAO, and ALF, and the filtered picture is stored in the decoding buffer as a reference picture. The reconstructed picture is used as the picture to be filtered, and the reconstructed picture is filtered by using the neural network filter through the method of some embodiments to obtain a filtered picture. A display picture is generated based on the filtered picture, and the display picture is input into the display device for display.

In some embodiments, the filtered picture further may be further filtered by using at least one filter of DBF, SAO, and ALF.

In some embodiments, the picture to be filtered of some embodiments may be a picture filtered by using at least one filter of DBF, SAO, and ALF. The filtered picture is further filtered by using the neural network filter through the method of some embodiments.

In the picture filtering method provided in some embodiments, a picture to be filtered is obtained. A neural network filter is determined, and the picture to be filtered is divided according to a blocking mode the same as a blocking mode for a training picture used by the neural network filter in a training process to obtain N picture blocks to be filtered, N being a positive integer. The N picture blocks to be filtered are filtered by using the neural network filter to obtain a filtered picture. For example, in some embodiments, a blocking mode used by the neural network filter in an actual usage process is maintained the same as a blocking mode used during training. This may the neural network filter to increase filtering performance, thereby improving a picture filtering effect.

Figure 46:
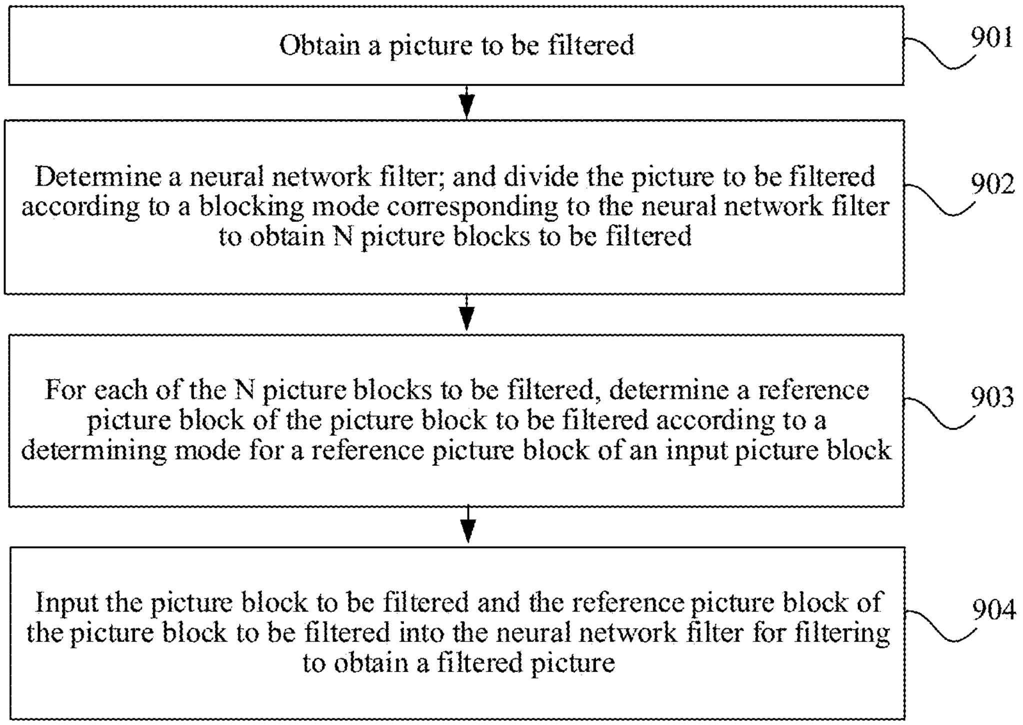
FIG. 46 is a schematic flowchart of a picture filtering method according to some embodiments.

FIG. 46 is a schematic flowchart of a picture filtering method according to some embodiments. FIG. 46 may be understood in relation to the filtering method according to some embodiments as shown in FIG. 13.

As shown in FIG. 46, the picture filtering method of some embodiments include:

901: Obtain a picture to be filtered.

For a non-video codec scenario, the picture to be filtered may be captured by a picture acquisition device, or drawn through a picture drawing apparatus, or the like.

For a video codec scenario, the picture to be filtered may be a reconstructed picture.

For implementation details of operation 901 according to some embodiments, reference may be made to operation 801.

902: Determine a neural network filter; and divide the picture to be filtered according to a blocking mode corresponding to the neural network filter to obtain N picture blocks to be filtered.

The blocking mode is a blocking mode for a training picture used by the neural network filter in a training process. For example, the picture to be filtered is divided according to a blocking mode the same as the blocking mode for the training picture used by the neural network filter in the training process to obtain N picture blocks to be filtered, N being a positive integer.

For example, the blocking mode for the training picture used by the neural network filter in the training process is determining one CTU in the training picture as one training picture block. For example, during actual filtering, one CTU of the picture to be filtered is determined as one picture block to be filtered, thereby obtaining N picture blocks to be filtered.

For implementation details of operation 902 according to some embodiments, reference may be made to operation 802.

903: For each of the N picture blocks to be filtered, determine a reference picture block of the picture block to be filtered according to a determining mode for a reference picture block of an input picture block.

In some embodiments, the determining mode for the reference picture block of the picture block to be filtered is consistent with the determining mode for the reference picture block of the input picture block.

In some embodiments, if the reference picture block of the input picture block includes at least one of a temporal reference picture block and a spatial reference picture block of the input picture block, the reference picture block of the picture block to be filtered includes at least one of a temporal reference picture block and a spatial reference picture block of the picture block to be filtered.

For implementation details of operation 903 according to some embodiments, reference may be made to operation 803-B12.

904: Input the picture block to be filtered and the reference picture block of the picture block to be filtered into the neural network filter for filtering to obtain a filtered picture.

In some embodiments, to further improve the filtering effect, in the training process, in addition to the input picture block, the reference picture block of the input picture block is also input to improve the filtering effect of the neural network filter. For example, in the actual filtering process, to maintain the consistency between input information in the actual filtering process and input information in the training process, the reference picture block of the picture block to be filtered is determined by using the same determining mode as the determining mode for the reference picture block of the input picture block, and the picture block to be filtered and the reference picture block of the picture block to be filtered are input into the neural network filter to achieve the filtering effect for the picture to be filtered.

In the picture filtering method provided in some embodiments, the picture to be filtered is divided according to the same blocking mode as the blocking mode for the training picture used by the neural network filter in the training process to obtain N picture blocks to be filtered. For each of the N picture blocks to be filtered, the reference picture block of the picture block to be filtered is determined according to the determining mode for the reference picture block of the input picture block. The picture block to be filtered and the reference picture block of the picture block to be filtered are input into the neural network filter for filtering to obtain a filtered picture. For example, in some embodiments, the blocking mode used by the neural network filter in the actual usage process is maintained consistent with the blocking mode used during training, and the determining mode for the reference picture block of the input picture block is maintained consistent with the determining mode for the reference picture block of the picture block to be filtered, to further improve the filtering effect of the neural network filter.

FIG. 13 to FIG. 46 are examples, and are not to be understood as limitations to the disclosure.

The method according to some embodiments are described in detail above with reference to FIG. 13 to FIG. 46. An apparatus according to some embodiments is described in detail below with reference to FIG. 47 and FIG. 48.

Figure 47:
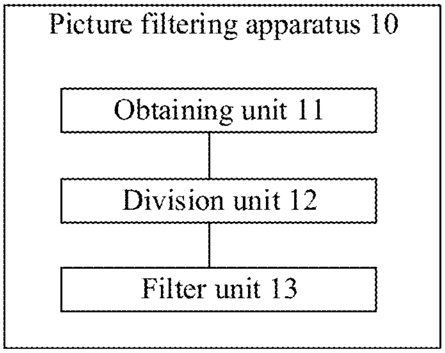
FIG. 47 is a schematic block diagram of a picture filtering apparatus according to some embodiments.

FIG. 47 is a schematic block diagram of a picture filtering apparatus according to some embodiments. The apparatus 10 may be an electronic device or a part of the electronic device. As shown in FIG. 47, the picture filtering apparatus 10 may include:

an obtaining unit 11, configured to obtain a picture to be filtered;

a division unit 12, configured to determine a neural network filter; and divide the picture to be filtered according to a blocking mode corresponding to the neural network filter to obtain N picture blocks to be filtered, the blocking mode being a blocking mode for a training picture used by the neural network filter in a training process, and N being a positive integer; and a filter unit 13, configured to filter the N picture blocks to be filtered by using the neural network filter to obtain a filtered picture.

In some embodiments, the blocking mode for the training picture includes determining M CTUs in the training picture as one training picture block, M being a positive integer.

The division unit 12 is configured to determine M CTUs in the picture to be filtered as one picture block to be filtered to obtain the N picture blocks to be filtered.

In some embodiments, the blocking mode for the training picture includes determining P residual CTUs in the training picture as one training picture block, P being a positive integer.

The division unit 12 is configured to determine P residual CTUs in the picture to be filtered as one picture block to be filtered to obtain the N picture blocks to be filtered.

In some embodiments, the neural network filter is obtained through training by using an extended picture block of the training picture block.

The filter unit 13 is configured to: for each of the N picture blocks to be filtered, extend the picture block to be filtered according to an extension mode for the training picture block to obtain an extended picture block to be filtered; filter the extended picture block to be filtered by using the neural network filter to obtain a filtered extended picture block; and determine a picture region corresponding to the picture block to be filtered in the filtered extended picture block as a filtered picture block corresponding to the picture block to be filtered.

In some embodiments, the extension mode for the training picture block includes extending at least one boundary region of the training picture block outwards.

The filter unit 13 is configured to extend at least one boundary region of the picture block to be filtered outwards to obtain the extended picture block to be filtered.

In some embodiments, the training picture includes an input picture. Input data during the training of the neural network filter includes an input picture block and a reference picture block of the input picture block. The input picture block is obtained by performing picture division on the input picture by using the blocking mode.

The filter unit 13 is configured to: for each of the N picture blocks to be filtered, determine a reference picture block of the picture block to be filtered; and input the picture block to be filtered and the reference picture block of the picture block to be filtered into the neural network filter for filtering to obtain a filtered picture block of the picture block to be filtered.

In some embodiments, the filter unit 13 is configured to obtain a determining mode for the reference picture block of the input picture block, the determining mode being configured for determining the corresponding reference picture block according to at least one of spatial domain information and time domain information of the input picture block; and determine the reference picture block of the picture block to be filtered according to the determining mode for the reference picture block of the input picture block.

In some embodiments, the reference picture block of the input picture block includes at least one of a temporal reference picture block and a spatial reference picture block of the input picture block; and the reference picture block of the picture block to be filtered includes at least one of a temporal reference picture block and a spatial reference picture block of the picture block to be filtered.

In some embodiments, the reference picture block of the input picture block also includes the spatial reference picture block of the input picture block.

The filter unit 13 is configured to determine the spatial reference picture block of the picture block to be filtered according to a determining mode for the spatial reference picture block of the input picture block.

In some embodiments, the spatial reference picture block of the input picture block includes at least one of an upper left picture block, a left-side picture block, and an upper picture block of the input picture block in the input picture.

The filter unit 13 is configured to determine at least one of an upper left picture block, a left-side picture block, and an upper picture block of the picture block to be filtered in the picture to be filtered as the spatial reference picture block of the picture block to be filtered.

In some embodiments, the reference picture block of the input picture block also includes the temporal reference picture block of the input picture block.

The filter unit 13 is configured to determine the temporal reference picture block of the picture block to be filtered according to a determining mode for the temporal reference picture block of the input picture block.

In some embodiments, the temporal reference picture block of the input picture block includes a picture block at a location corresponding to the input picture block in a reference picture of the input picture.

The filter unit 13 is configured to determine a reference picture of the picture to be filtered; and determine a picture block at a location corresponding to the picture block to be filtered in the reference picture of the picture to be filtered as the temporal reference picture block of the picture block to be filtered.

In some embodiments, the training picture includes an input picture and a target picture corresponding to the input picture. The neural network filter is obtained through training by using an input picture block as input data and a target picture block as a target. The input picture block is obtained by performing picture division on the input picture by using the blocking mode for the training picture. The target picture block is obtained by performing picture division on the target picture by using the blocking mode for the training picture.

In some embodiments, the obtaining unit 11 is configured to reconstruct a current picture to obtain a reconstructed picture of the current picture; and determine the reconstructed picture as the picture to be filtered.

In some embodiments, the filter unit 13 is further configured to generate, based on the filtered picture, a reference picture for prediction, and store the generated reference picture into a decoding buffer.

In some embodiments, the filter unit 13 is further configured to generate a display picture based on the filtered picture, input the display picture into a display device for display, and skip storing the filtered picture or a reprocessed picture of the filtered picture into a decoding buffer.

According to some embodiments, each unit may exist respectively or be combined into one or more units. Some units may be further split into multiple smaller function subunits, thereby implementing the same operations without affecting the technical effects of some embodiments. The units are divided based on logical functions. In actual applications, a function of one unit may be realized by multiple units, or functions of multiple units may be realized by one unit. In some embodiments, the apparatus may further include other units. In actual applications, these functions may also be realized cooperatively by the other units, and may be realized cooperatively by multiple units.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Figure 48:
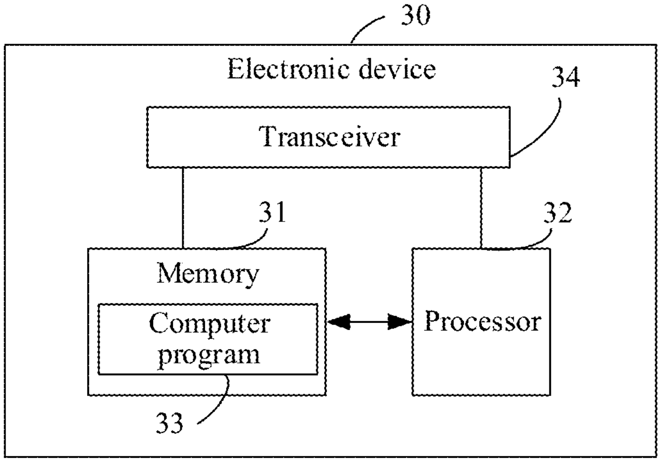
FIG. 48 is a schematic block diagram of an electronic device according to some embodiments.

FIG. 48 is a schematic block diagram of an electronic device according to some embodiments. The electronic device is configured to perform the foregoing method embodiments. As shown in FIG. 48, the electronic device 30 may include:

a memory 31 and a processor 32. The memory 31 is configured to store a computer program 33, and transmit the computer program 33 to the processor 32. For example, the processor 32 may call, from the memory 31, and run the computer program 33 to implement the methods in some embodiments.

For example, the processor 32 may be configured to perform the blocks of the foregoing methods according to instructions in the computer program 33.

In some embodiments, the processor 32 may include, but is not limited to:

a processor, a digital signal processor (DSP), an application-specific integrated circuit (ASIC), a field-programmable gate array (FPGA), or other programmable logic devices, discrete gate or transistor logic devices, and discrete hardware components.

In some embodiments, the memory 31 includes, but is not limited to:

a volatile memory and/or a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DRRAM), are available.

In some embodiments, the computer program 33 may be segmented into one or more modules. The one or more modules are stored in the memory 31 and executed by the processor 32 to complete the picture filtering method provided in some embodiments. The one or more modules may be a series of computer program instruction segments capable of performing different functions. The instruction segment is configured for describing the execution process of the computer program 33 in the electronic device.

As shown in FIG. 48, the electronic device 30 may further include:

a transceiver 34. The transceiver 34 may be connected to the processor 32 or the memory 31.

The processor 32 may control the transceiver 34 to communicate with another device, such as sending information or data to the another device, or receiving information or data sent by the another device. The transceiver 34 may include a transmitter and a receiver. The transceiver 34 may further include an antenna. There may be one or more antennas.

Components in the electronic device 30 are connected through a bus system. In addition to a data bus, the bus system also includes a power bus, a control bus, a status signal bus, and the like.

According to one aspect of the application, a computer storage medium is provided, having a computer program stored therein, the computer program, when executed by a computer, enabling the computer to perform the methods of the foregoing method embodiments.

Some embodiments further provides a computer program product including an instruction, the instruction, when executed by a computer, causing the computer to perform the methods of the foregoing method embodiments.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A picture filtering method, performed by an electronic device, comprising:

obtaining a picture to be filtered;

determining a neural network filter;

dividing the picture to be filtered according to a blocking mode corresponding to the neural network filter to obtain one or more picture blocks to be filtered, the blocking mode being a same blocking mode for a training picture used in training the neural network filter, wherein the blocking mode for the training picture comprises determining a training picture block comprising M coding tree units (CTUs) in the training picture as a training picture block, M being a positive integer, and wherein in a first mode, a picture block of the one or more picture blocks to be filtered comprises M CTUs from the picture to be filtered; and filtering the one or more picture blocks based on the neural network filter to obtain a filtered picture.

2. The method according to claim 1, wherein the dividing the picture to be filtered comprises determining the one or more picture blocks from the picture to be filtered in the first mode of using one or more CTUs as a picture block to be filtered.

3. The method according to claim 2, wherein the neural network filter is obtained by training an extended picture block of the training picture block, and wherein the filtering the one or more picture blocks comprises:

for each of the one or more picture blocks, extending the picture block to be filtered according to an extension mode for the training picture block to obtain the extended picture block;

filtering the extended picture block based on the neural network filter to obtain a filtered extended picture block; and determining a picture region corresponding to the picture block to be filtered in the filtered extended picture block as a filtered picture block corresponding to the picture block to be filtered.

4. The method according to claim 3, wherein the extension mode comprises extending at least one first boundary region of the training picture block outwards, and wherein the extending the picture block to be filtered comprises extending at least one second boundary region of the picture block to be filtered outwards to obtain the extended picture block.

5. The method according to claim 1, wherein the blocking mode for the training picture comprises determining one or more residual coding tree units (CTUs) in the training picture as a training picture block, and wherein in a second mode, the dividing the picture to be filtered comprises determining the one or more picture blocks from the picture to be filtered using the one or more residual CTUs as a picture block to be filtered.

6. The method according to claim 1, wherein the training picture comprises an input picture, wherein input data in the training the neural network filter comprises an input picture block and a first reference picture block of the input picture block, wherein the input picture block is obtained by performing picture division on the input picture based on the blocking mode, and wherein the filtering the one or more picture blocks comprises:

for each of the one or more picture blocks, determining a second reference picture block of a picture block to be filtered; and inputting the picture block to be filtered and the second reference picture block into the neural network filter to obtain a filtered picture block of the picture block to be filtered.

7. The method according to claim 6, wherein the determining the second reference picture block comprises:

obtaining a determining mode for the first reference picture block; and determining the second reference picture block according to the determining mode, and wherein the determining mode determines the first reference picture block according to at least one of: spatial domain information of the input picture block or time domain information of the input picture block.

8. The method according to claim 7, wherein the first reference picture block comprises at least one of: a first temporal reference picture block of the input picture block or a first spatial reference picture block of the input picture block, and wherein the second reference picture block comprises at least one of: a second temporal reference picture block of the picture block to be filtered or a second spatial reference picture block of the picture block to be filtered.

9. The method according to claim 8, wherein the determining the second reference picture block comprises determining the second spatial reference picture block according to a first determining mode for the first spatial reference picture block.

10. The method according to claim 9, wherein the first spatial reference picture block comprises at least one of: a first upper left picture block of the input picture block, a first left-side picture block of the input picture block, or a first upper picture block of the input picture block, and wherein the determining the second spatial reference picture block comprises determining at least one of: a second upper left picture block of the picture block to be filtered, a second left-side picture block of the picture block to be filtered, or a second upper picture block of the picture block to be filtered as the second spatial reference picture block.

11. A picture filtering apparatus, comprising:

at least one memory configured to store computer program code; and at least one processor configured to read the program code and operate as instructed by the program code, the program code comprising:

obtaining code configured to cause at least one of the at least one processor to obtain a picture to be filtered;

first determining code configured to cause at least one of the at least one processor to determine a neural network filter;

division code configured to cause at least one of the at least one processor to divide the picture to be filtered according to a blocking mode corresponding to the neural network filter to obtain one or more picture blocks to be filtered, the blocking mode being a same blocking mode for a training picture in training the neural network filter, wherein the blocking mode for the training picture comprises determining a training picture block comprising M coding tree units (CTUs) in the training picture as a training picture block, M being a positive integer, and wherein in a first mode, a picture block of the one or more picture blocks to be filtered comprises M CTUs from the picture to be filtered; and first filtering code configured to cause at least one of the at least one processor to filter the one or more picture blocks based on the neural network filter to obtain a filtered picture.

12. The apparatus according to claim 11, wherein the division code is configured to cause at least one of the at least one processor to determine the one or more picture blocks from the picture to be filtered in the first mode of using one or more CTUs as a picture block to be filtered.

13. The apparatus according to claim 12, wherein the neural network filter is obtained by training an extended picture block of the training picture block, and wherein the first filtering code comprises:

extending code configured to cause at least one of the at least one processor to extend, for each of the one or more picture blocks, the picture block to be filtered according to an extension mode for the training picture block to obtain the extended picture block;

second filtering code configured to cause at least one of the at least one processor to filter the extended picture block based on the neural network filter to obtain a filtered extended picture block; and second determining code configured to cause at least one of the at least one processor to determine a picture region corresponding to the picture block to be filtered in the filtered extended picture block as a filtered picture block corresponding to the picture block to be filtered.

14. The apparatus according to claim 13, wherein the extension mode comprises extending at least one first boundary region of the training picture block outwards, and wherein the extending code is configured to cause at least one of the at least one processor to extend at least one second boundary region of the picture block to be filtered outwards to obtain the extended picture block.

15. The apparatus according to claim 11, wherein the blocking mode for the training picture comprises determining one or more residual coding tree units (CTUs) in the training picture as a training picture block, and wherein in a second mode, the division code is configured to cause at least one of the at least one processor to determine the one or more picture blocks from the picture to be filtered using the one or more residual CTUs as a picture block to be filtered.

16. The apparatus according to claim 11, wherein the training picture comprises an input picture, wherein input data in the training the neural network filter comprises an input picture block and a first reference picture block of the input picture block, wherein the input picture block is obtained by performing picture division on the input picture based on the blocking mode, and wherein the first filtering code comprises:

second determining code configured to cause at least one of the at least one processor to determine, for each of the one or more picture blocks, a second reference picture block of a picture block to be filtered; and inputting code configured to cause at least one of the at least one processor to input the picture block to be filtered and the second reference picture block into the neural network filter to obtain a filtered picture block of the picture block to be filtered.

17. The apparatus according to claim 16, wherein the second determining code is configured to cause at least one of the at least one processor to:

obtain a determining mode for the first reference picture block; and determine the second reference picture block according to the determining mode, and wherein the determining mode determines the first reference picture block according to at least one of: spatial domain information of the input picture block or time domain information of the input picture block.

18. The apparatus according to claim 17, wherein the first reference picture block comprises at least one of: a first temporal reference picture block of the input picture block or a first spatial reference picture block of the input picture block, and wherein the second reference picture block comprises at least one of: a second temporal reference picture block of the picture block to be filtered or a second spatial reference picture block of the picture block to be filtered.

19. The apparatus according to claim 18, wherein the second determining code is configured to cause at least one of the at least one processor to determine the second spatial reference picture block according to a first determining mode for the first spatial reference picture block.

20. A non-transitory computer-readable storage medium, storing computer code which, when executed by at least one processor, causes the at least one processor to at least:

obtain a picture to be filtered;

determine a neural network filter;

divide the picture to be filtered according to a blocking mode corresponding to the neural network filter to obtain one or more picture blocks to be filtered, the blocking mode being a same blocking mode for a training picture in training the neural network filter, wherein the blocking mode for the training picture comprises determining a training picture block comprising M coding tree units (CTUs) in the training picture as a training picture block, M being a positive integer, and wherein in a first mode, a picture block of the one or more picture blocks to be filtered comprises M CTUs from the picture to be filtered; and filter the one or more picture blocks based on the neural network filter to obtain a filtered picture.

* * * * *